United States Patent
Ma et al.

(10) Patent No.: US 11,665,706 B2
(45) Date of Patent: May 30, 2023

(54) LAYER MAPPING METHODS FOR PIGGYBACKED DOWNLINK CONTROL INFORMATION

(71) Applicant: QUALCOMM incorporated, San Diego, CA (US)

(72) Inventors: Jun Ma, San Diego, CA (US); Xiaoxia Zhang, San Diego, CA (US); Tao Luo, San Diego, CA (US); Qiang Wu, San Diego, CA (US); Juan Montojo, San Diego, CA (US); Peter Gaal, San Diego, CA (US); Mehmet Izzet Gurelli, San Diego, CA (US); Iyab Issam Sakhnini, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 17/244,916

(22) Filed: Apr. 29, 2021

(65) Prior Publication Data

US 2021/0352702 A1     Nov. 11, 2021

Related U.S. Application Data

(60) Provisional application No. 63/020,493, filed on May 5, 2020.

(51) Int. Cl.
*H04W 56/00*     (2009.01)
*H04W 72/23*     (2023.01)
(Continued)

(52) U.S. Cl.
CPC ............ *H04W 72/23* (2023.01); *H04L 1/0004* (2013.01); *H04L 1/1664* (2013.01);
(Continued)

(58) Field of Classification Search
CPC ......... H04W 72/1289; H04W 72/0446; H04W 72/1257; H04W 72/1263; H04L 1/0004; H04L 1/1664
(Continued)

(56) References Cited

U.S. PATENT DOCUMENTS

| | | | | |
|---|---|---|---|---|
| 2011/0249633 A1* | 10/2011 | Hong | ................ | H04W 72/042 370/328 |
| 2012/0163334 A1* | 6/2012 | Miki | .................... | H04L 5/0053 370/330 |

(Continued)

FOREIGN PATENT DOCUMENTS

WO    WO-2018202194 A1    11/2018

OTHER PUBLICATIONS

International Search Report and Written Opinion—PCT/US2021/030255—ISAEPO—dated Aug. 5, 2021.

*Primary Examiner* — Sai Ming Chan
(74) *Attorney, Agent, or Firm* — Holland & Hart LLP

(57) ABSTRACT

Methods, systems, and devices for wireless communications are described. A base station may identify, for a user equipment (UE), a configuration for receiving a set of downlink control information (DCI) messages on one or more layers of a set of layers of a downlink shared channel. The base station may transmit, to the UE, a first DCI message in a downlink control channel, where the first DCI message may schedule resources of the downlink shared channel for the set of piggybacking DCI messages. The UE may receive the first DCI message and identify the configuration for receiving the set of DCI messages on the one or more layers of the downlink shared channel. The UE may receive, from the base station, the set of DCI messages on the one or more layers of the downlink shared channel based on the identified configuration.

30 Claims, 19 Drawing Sheets

(51) Int. Cl.
*H04W 72/0446* (2023.01)
*H04L 1/1607* (2023.01)
*H04L 1/00* (2006.01)
*H04W 72/1263* (2023.01)
*H04W 72/50* (2023.01)

(52) U.S. Cl.
CPC ... *H04W 72/0446* (2013.01); *H04W 72/1263* (2013.01); *H04W 72/535* (2023.01)

(58) Field of Classification Search
USPC .......................................................... 370/329
See application file for complete search history.

(56) References Cited

U.S. PATENT DOCUMENTS

| | | | |
|---|---|---|---|
| 2013/0083753 A1* | 4/2013 | Lee ........................ | H04L 1/1858 |
| | | | 370/329 |
| 2015/0334683 A1* | 11/2015 | Guo ....................... | H04L 5/0048 |
| | | | 370/329 |
| 2016/0242166 A1* | 8/2016 | Nam ................... | H04W 72/0413 |
| 2018/0124753 A1* | 5/2018 | Sun ..................... | H04W 72/042 |

\* cited by examiner

LAYER MAPPING METHODS FOR PIGGYBACKED DOWNLINK CONTROL INFORMATION

CROSS REFERENCE

The present application for patent claims the benefit of U.S. Provisional Patent Application No. 63/020,493 by MA et al., entitled "LAYER MAPPING METHODS FOR PIGGYBACKED DOWNLINK CONTROL INFORMATION," filed May 5, 2020, assigned to the assignee hereof, and expressly incorporated by reference herein.

FIELD OF TECHNOLOGY

The following relates generally to wireless communications and more specifically to layer mapping methods for piggybacked downlink control information (DCI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, one or more downlink control information (DCI) messages may be piggybacked on a downlink shared channel. Conventional techniques related to configuring the piggybacking DCIs on the downlink shared channel may be improved.

SUMMARY

The described techniques relate to improved methods, systems, devices, and apparatuses that support layer mapping methods for piggybacked downlink control information (DCI). Generally, the described techniques provide for methods by which a base station, or a user equipment (UE), or both may configure one or more DCIs on a downlink shared channel (e.g., physical downlink shared channel (PDSCH)), when the downlink shared channel is configured with one or more layers, or codewords. For example, a base station may identify, for a UE, a configuration for receiving a set of DCI messages on one or more layers of a set of layers of a downlink shared channel. The configuration may piggyback all DCIs on a single layer, or may split the DCIs and piggyback the DCIs on multiple layers. In some cases, the piggybacking configuration may be based on a modulation and coding scheme (MCS) or signal to noise ratio (SNR) of one or more of the layers, based on a preconfigured or signaled threshold, or based on the number of DCIs and the number of layers, or a combination thereof. The base station may transmit, to the UE, a first DCI message in a downlink control channel (e.g., physical downlink control channel (PDCCH)), where the first DCI message may schedule resources of the downlink shared channel for the set of DCI messages. The UE may receive the first DCI message and identify the configuration for receiving the set of DCI messages on the one or more layers of the downlink shared channel. The UE may receive, from the base station, the set of DCI messages on the one or more layers of the downlink shared channel based on the identified configuration.

A method of wireless communications at a UE is described. The method may include receiving a first DCI message in a downlink control channel, the first DCI message scheduling first resources of a downlink shared channel for a set of DCI messages, identifying a configuration for receiving the set of DCI messages on one or more layers of a set of layers of the downlink shared channel based on the first DCI message, and receiving the set of DCI messages on the one or more layers of the downlink shared channel based on the identified configuration.

An apparatus for wireless communications at a UE is described. The apparatus may include a processor, memory coupled with the processor, and instructions stored in the memory. The instructions may be executable by the processor to cause the apparatus to receive a first DCI message in a downlink control channel, the first DCI message scheduling first resources of a downlink shared channel for a set of DCI messages, identify a configuration for receiving the set of DCI messages on one or more layers of a set of layers of the downlink shared channel based on the first DCI message, and receive the set of DCI messages on the one or more layers of the downlink shared channel based on the identified configuration.

Another apparatus for wireless communications at a UE is described. The apparatus may include means for receiving a first DCI message in a downlink control channel, the first DCI message scheduling first resources of a downlink shared channel for a set of DCI messages, identifying a configuration for receiving the set of DCI messages on one or more layers of a set of layers of the downlink shared channel based on the first DCI message, and receiving the set of DCI messages on the one or more layers of the downlink shared channel based on the identified configuration.

A non-transitory computer-readable medium storing code for wireless communications at a UE is described. The code may include instructions executable by a processor to receive a first DCI message in a downlink control channel, the first DCI message scheduling first resources of a downlink shared channel for a set of DCI messages, identify a configuration for receiving the set of DCI messages on one or more layers of a set of layers of the downlink shared channel based on the first DCI message, and receive the set of DCI messages on the one or more layers of the downlink shared channel based on the identified configuration.

In some examples of the method, apparatuses, and non-transitory computer-readable medium described herein, identifying the configuration may include operations, features, means, or instructions for identifying that the set of DCI messages may be mapped to a single layer of the set of layers, where the one or more layers include the single layer.

In some examples of the method, apparatuses, and non-transitory computer-readable medium described herein, the set of DCI messages may be mapped to the single layer based on the single layer having a highest MCS for the set of layers.

In some examples of the method, apparatuses, and non-transitory computer-readable medium described herein, the set of DCI messages may be mapped to the single layer based on the single layer having a highest SNR for the set of layers.

In some examples of the method, apparatuses, and non-transitory computer-readable medium described herein, the set of DCI messages may be mapped to the single layer based on the single layer having a lowest index value for the set of layers.

Some examples of the method, apparatuses, and non-transitory computer-readable medium described herein may further include operations, features, means, or instructions for identifying a ratio of a first payload size of the set of DCI messages mapped to the single layer to a second payload size of the downlink shared channel mapped to the single layer, and determining that the ratio fails to satisfy a threshold value, where the set of DCI messages may be mapped to the single layer based on the determining.

In some examples of the method, apparatuses, and non-transitory computer-readable medium described herein, an MCS associated with the downlink shared channel for the single layer may be a highest MCS for the downlink shared channel for the set of layers.

In some examples of the method, apparatuses, and non-transitory computer-readable medium described herein, identifying the configuration may include operations, features, means, or instructions for identifying a ratio of a first payload size of the set of DCI messages mapped to a single layer of the set of layers to a second payload size of the downlink shared channel mapped to the single layer, and determining that the ratio satisfies a threshold value, where the set of DCI messages may be mapped to multiple layers of the set of layers based on the determining.

In some examples of the method, apparatuses, and non-transitory computer-readable medium described herein, an MCS associated with the second payload size of the downlink shared channel may be a highest MCS for the downlink shared channel for the set of layers.

In some examples of the method, apparatuses, and non-transitory computer-readable medium described herein, identifying the configuration may include operations, features, means, or instructions for identifying that the set of DCI messages may be mapped to multiple layers of the set of layers, and identifying, for each layer of the multiple layers, that a first number of DCI messages of the set of DCI messages mapped to the layer may be no more than one different than a second number of DCI messages of the set of DCI messages mapped to any other layer of the multiple layers.

In some examples of the method, apparatuses, and non-transitory computer-readable medium described herein, the first number of DCI messages may be a same number for each layer of the multiple layers.

In some examples of the method, apparatuses, and non-transitory computer-readable medium described herein, the first number of DCI messages for the layer may be a different number than the second number of DCI messages for at least one other layer of the multiple layers.

In some examples of the method, apparatuses, and non-transitory computer-readable medium described herein, the first number of DCI messages includes a first portion of a second DCI message, and the second number of DCI messages includes a second portion of the second DCI message.

In some examples of the method, apparatuses, and non-transitory computer-readable medium described herein, the set of DCI messages may be concatenated on the one or more layers.

A method of wireless communication at a base station is described. The method may include identifying, for a UE, a configuration for receiving a set of DCI messages on one or more layers of a set of layers of a downlink shared channel, transmitting, to the UE, a first DCI message in a downlink control channel, the first DCI message scheduling first resources of the downlink shared channel for the set of DCI messages, and transmitting, to the UE, the set of DCI messages on the one or more layers of the downlink shared channel based on the identified configuration.

An apparatus for wireless communication at a base station is described. The apparatus may include a processor, memory coupled with the processor, and instructions stored in the memory. The instructions may be executable by the processor to cause the apparatus to identify, for a UE, a configuration for receiving a set of DCI messages on one or more layers of a set of layers of a downlink shared channel, transmit, to the UE, a first DCI message in a downlink control channel, the first DCI message scheduling first resources of the downlink shared channel for the set of DCI messages, and transmit, to the UE, the set of DCI messages on the one or more layers of the downlink shared channel based on the identified configuration.

Another apparatus for wireless communication at a base station is described. The apparatus may include means for identifying, for a UE, a configuration for receiving a set of DCI messages on one or more layers of a set of layers of a downlink shared channel, transmitting, to the UE, a first DCI message in a downlink control channel, the first DCI message scheduling first resources of the downlink shared channel for the set of DCI messages, and transmitting, to the UE, the set of DCI messages on the one or more layers of the downlink shared channel based on the identified configuration.

A non-transitory computer-readable medium storing code for wireless communication at a base station is described. The code may include instructions executable by a processor to identify, for a UE, a configuration for receiving a set of DCI messages on one or more layers of a set of layers of a downlink shared channel, transmit, to the UE, a first DCI message in a downlink control channel, the first DCI message scheduling first resources of the downlink shared channel for the set of DCI messages, and transmit, to the UE, the set of DCI messages on the one or more layers of the downlink shared channel based on the identified configuration.

Some examples of the method, apparatuses, and non-transitory computer-readable medium described herein may further include operations, features, means, or instructions for mapping the set of DCI messages to a single layer, where the set of DCI messages may be transmitted on the single layer.

In some examples of the method, apparatuses, and non-transitory computer-readable medium described herein, the set of DCI messages may be mapped to the single layer based on the single layer having a highest MCS for the set of layers.

In some examples of the method, apparatuses, and non-transitory computer-readable medium described herein, the set of DCI messages may be mapped to the single layer based on the single layer having a highest SNR for the set of layers.

In some examples of the method, apparatuses, and non-transitory computer-readable medium described herein, the set of DCI messages may be mapped to the single layer based on the single layer having a lowest index value for the set of layers.

Some examples of the method, apparatuses, and non-transitory computer-readable medium described herein may further include operations, features, means, or instructions for comparing a first payload size of the set of DCI messages on a single layer of the set of layers to a second payload size of the downlink shared channel on the single layer, and mapping, based on a result of the comparing, the set of DCI messages to the single layer, where the set of DCI messages may be transmitted on the single layer.

In some examples of the method, apparatuses, and non-transitory computer-readable medium described herein, an MCS associated with the downlink shared channel for the single layer may be a highest MCS for the downlink shared channel for the set of layers.

Some examples of the method, apparatuses, and non-transitory computer-readable medium described herein may further include operations, features, means, or instructions for comparing a first payload size of the set of DCI messages to a second payload size of the downlink shared channel, and mapping, based on a result of the comparing, the set of DCI messages to multiple layers, where the set of DCI messages may be transmitted on the multiple layers.

In some examples of the method, apparatuses, and non-transitory computer-readable medium described herein, an MCS associated with the second payload size of the downlink shared channel may be a highest MCS for the downlink shared channel for the set of layers.

Some examples of the method, apparatuses, and non-transitory computer-readable medium described herein may further include operations, features, means, or instructions for mapping the set of DCI messages to multiple layers, the set of DCI messages transmitted on the multiple layers, where, for each layer of the multiple layers, a first number of DCI messages of the set of DCI messages mapped to the layer may be no more than one different than a second number of DCI messages of the set of DCI messages mapped to any other layer of the multiple layers.

In some examples of the method, apparatuses, and non-transitory computer-readable medium described herein, the first number of DCI messages may be a same number for each layer of the multiple layers.

In some examples of the method, apparatuses, and non-transitory computer-readable medium described herein, the first number of DCI messages for the layer may be a different number than the second number of DCI messages for at least one other layer of the multiple layers.

In some examples of the method, apparatuses, and non-transitory computer-readable medium described herein, the first number of DCI messages includes a first portion of a second DCI message, and the second number of DCI messages includes a second portion of the second DCI message.

In some examples of the method, apparatuses, and non-transitory computer-readable medium described herein, the set of DCI messages may be concatenated on the one or more layers.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
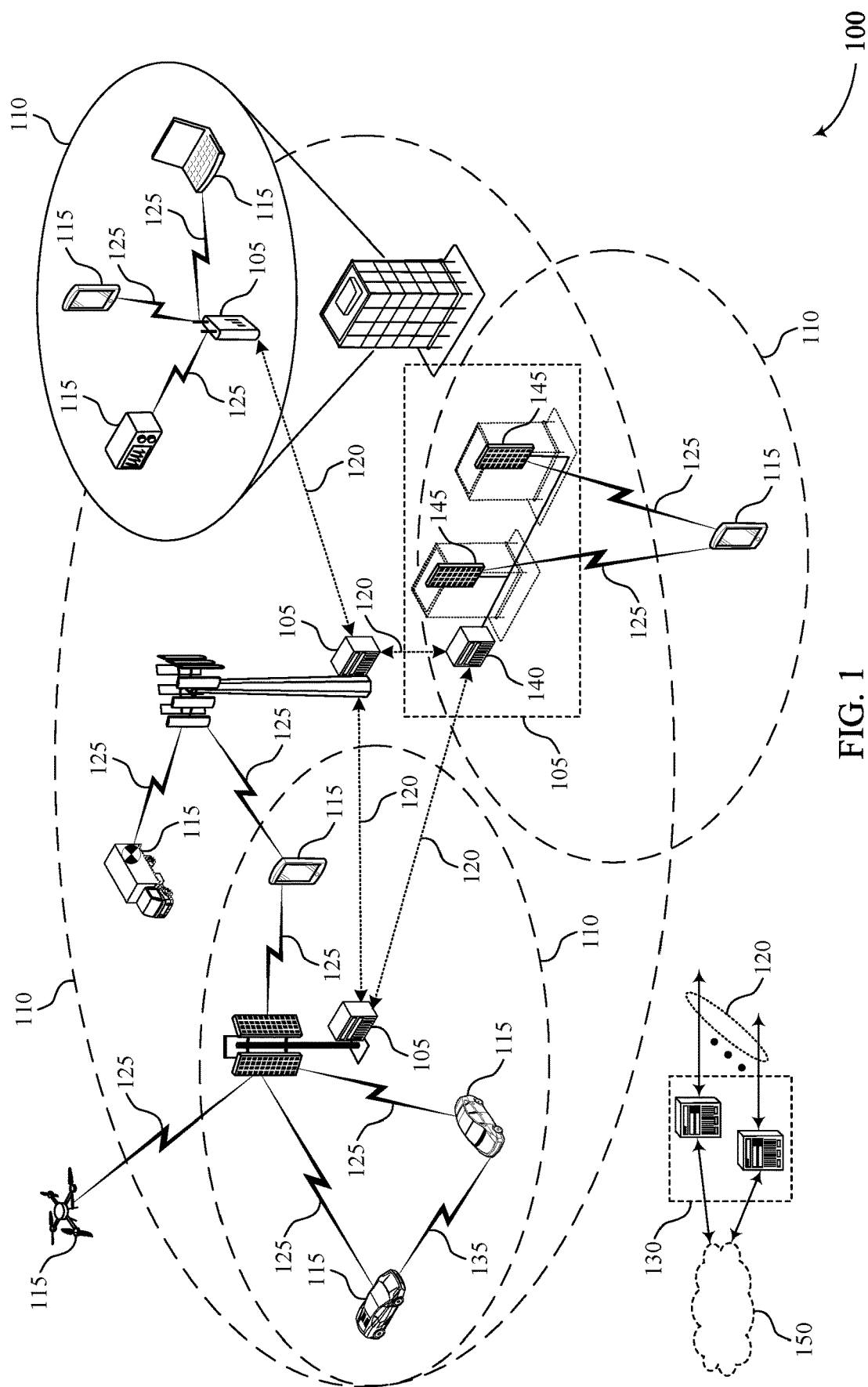
FIG. 1 illustrates an example of a system for wireless communications that supports layer mapping methods for piggybacked downlink control information (DCI) in accordance with aspects of the present disclosure.

Some wireless communications systems may operate at high frequency (HF) bands (e.g., 60 GHz). At such high bands, slot durations may be shorter compared to the slot durations of other wireless communications systems operating at lower frequency bands (e.g., systems operating in frequency range 1 (FR1), or frequency range 2 (FR2) or a combination thereof) due to higher subcarrier spacing (e.g., 960 kHz, 1.92 MHz, 3.84 MHz). As such, the number of control channel (e.g., physical downlink control channel (PDCCH)) monitoring occasions may increase, which may lead to high power consumption. Further, due the shorter slot duration and narrow analog beamformed transmissions at the HF bands, the chance of transmitting multiple DCIs to multiple different UEs may be reduced. Rather, a base station may transmit multiple DCIs to the same UE. To mitigate power consumption, the control channel monitoring occasions may be reduced due to the high specificity of HF band beams targeting a single UE.

Some wireless communications systems may use piggybacked downlink control information (DCI) messages to enable a user equipment (UEs) to reduce the frequency of control channel monitoring at the UEs. For example, a UE may be configured to monitor control channel resources in periodic slots for DCI messages and may refrain from monitoring control channel resources in one or more of the slots in between the periodic slots. The DCI messages received in the periodic slots may schedule shared channel resources in the slots in between the periodic slots. For example, a UE may periodically receive piggybacked DCIs. The piggybacked DCIs may indicate scheduling information (e.g., grant information) for one or more slots where a DCI will not be received. As such, the UE may not monitor the control region associated with the slot where a DCI may not be received. The piggybacked DCIs may be scheduled by a DCI message received in the control region of that slot. For example, a DCI message received by a UE in control channel resources may schedule the UE to receive one or more further DCI messages along with data in the downlink shared channel resources. Piggybacking DCI messages on a downlink shared channel in this manner may reduce control channel monitoring density for the UE, which may support reduced power consumption at the UE.

In some cases, a UE may be configured with multiple codewords (e.g., such as in multiple-input multiple-output (MIMO) scenarios), or multiple layers, or both. In such cases, the configuration of the set of DCI messages in the shared channel may be based on the number of layers a UE is configured with. In some implementations, each DCI in the set of DCI messages may be mapped to a single layer. The DCIs may be mapped to the layer with the higher modulation and coding scheme (MCS), or the layer that is associated with the higher signal to noise ratio (SNR), or both of the available layers. In some cases, the DCIs may be mapped to the layer with the lowest index, such as if each layer has the same MCS, or SNR. In some cases, the payload associated with the piggybacked DCIs may be large. To mitigate the large DCI payloads, a threshold and payload ratio may be configured. In some examples, if the payload of the piggybacking DCIs on one layer relative to the payload of the shared channel with the higher MCS or SNR is above a preconfigured or signaled threshold, then the DCIs may be split among multiple layers. In some cases, unrelated to MCS, and SNR, the DCIs may be mapped to multiple layers. For example, the DCIs may be mapped evenly on each available layer.

Particular aspects of the subject matter described herein may be implemented to realize one or more advantages. The described techniques may support improvements in piggybacking a set of DCI messages on a shared channel by implementing configurations that consider UEs that support multiple layers, or codewords, or both. The described techniques may mitigate power consumption, and decrease payload, among other advantages. As such, supported techniques may include improved network operations and, in some examples, may promote network efficiencies, among other benefits.

Aspects of the disclosure are initially described in the context of wireless communications systems. Aspects are then described with respect to a resource map, DCI piggybacking schemes, and a process flow. Aspects of the disclosure are further illustrated by and described with reference to apparatus diagrams, system diagrams, and flowcharts that relate to layer mapping methods for piggybacked DCI.

FIG. 1 illustrates an example of a wireless communications system 100 that supports layer mapping methods for piggybacked DCI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a RF spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the HF or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Figure 2:
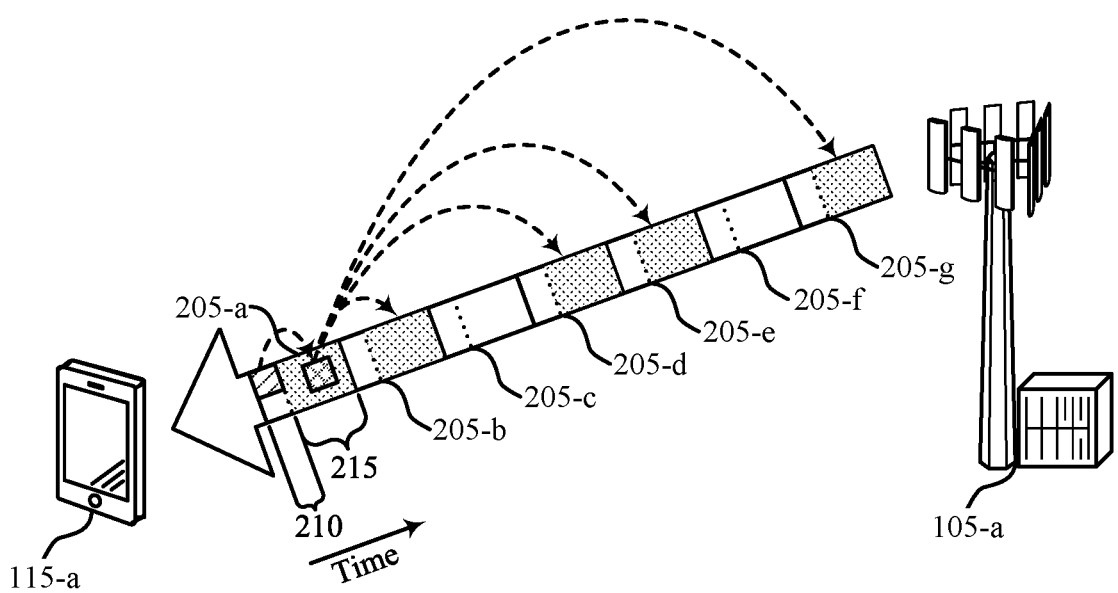
FIG. 2 illustrates an example of a wireless communications system that supports layer mapping methods for piggybacked DCI in accordance with aspects of the present disclosure.

A base station 105, or a UE 115, or both may configure one or more DCIs on a downlink shared channel (e.g., physical downlink shared channel (PDSCH)), when the downlink shared channel is configured with one or more layers, or codewords. For example, a base station 105 may identify, for a UE 115, a configuration for receiving a set of DCI messages on one or more layers of a set of layers of a downlink shared channel. The configuration may piggyback all DCIs on a single layer, or may split the DCIs and piggyback the DCIs on multiple layers. In some cases, the piggybacking configuration may be based on a preconfigured or signaled threshold. The base station 105 may transmit, to the UE 115, a first DCI message in a downlink control channel (e.g., PDCCH), where the first DCI message may schedule resources of the downlink shared channel for the set of DCI messages. The UE 115 may receive the first DCI message and identify the configuration for receiving the set of DCI messages on the one or more layers of the downlink shared channel. The UE 115 may receive, from the base station 105, the set of DCI messages on the one or more layers of the downlink shared channel based on the identified configuration FIG. 2 illustrates an example of a wireless communications system 200 that supports layer mapping methods for piggybacked DCI in accordance with aspects of the present disclosure. The wireless communications system 200 may include base station 105-a and UE 115-a, which may be examples of a base station 105 and a UE 115 as described with reference to FIG. 1. In some cases, base station 105-a may implement a DCI mapping procedure to map one or more DCIs to one or more layers of a downlink shared channel. Additionally or alternatively, other wireless devices, such as UE 115-a, may implement the DCI mapping procedure.

Base station 105-a may communicate with UE 115-a over one or more slots 205, where each slot 205 may include one or more symbols. Each slot 205 may include a control region 210 and a data region 215. In some examples, base station 105-a may transmit a DCI message 220 to UE 115-a in a control region 210 of a slot 205. For instance, in the present example, base station 105-a may transmit a DCI message 220 to UE 115-a in the control region 210 of slot 205-a. The DCI message 220 may schedule one or more DCI messages 225 in the data region 215 of the slot 205 in which the DCI message 220 is received. For instance, in the present example, the control channel DCI message 220 received in slot 205-a may schedule one or more shared channel DCI messages 225 in the data region 215 of slot 205-a. The one or more shared channel DCI messages 225 may be piggybacked on a shared channel resource (e.g., a PDSCH or physical uplink shared channel (PUSCH) resource) in the data region 215. In such cases, the one or more shared channel DCI messages 225 may be multiplexed with one or more downlink shared channel messages.

In some implementations, the shared channel may be configured with multiple codewords, or layers, or both. In such cases, the configuration of one or more shared channel DCI messages 225 in the shared channel may be based on the number of layers UE 115-a is configured with. In some implementations, each DCI in the set of one or more shared channel DCI messages 225 may be mapped to a single layer. The one or more shared channel DCI messages 225 may be mapped to the layer with the higher MCS, or the layer that is associated with the higher SNR, or both of the available layers. In some cases, the DCIs may be mapped to the layer with the lowest index, such as if each layer has the same MCS, or SNR. In some cases, the payload associated with the one or more shared channel DCI messages 225 may be large. To mitigate large DCI payloads, a threshold may be configured. In some examples, if the payload of the one or more shared channel DCI messages 225 on one layer relative to the payload of the shared channel with the higher MCS or SNR is above a preconfigured or signaled threshold, then the one or more shared channel DCI messages 225 may be split among multiple layers. In some cases, unrelated to MCS, and SNR, the one or more shared channel DCI messages 225 may be mapped to multiple layers. For example, the one or more shared channel DCI messages 225 may be mapped evenly on each available layer.

The one or more shared channel DCI messages 225 may, in turn, schedule data transmissions from base station 105-*a* (e.g., downlink data transmissions, such as PDSCH transmissions) or to base station 105-*a* (e.g., uplink data transmissions, such as PUSCH transmissions) in one or more corresponding slots 205. For instance, a first DCI message 225 received in the data region 215 of slot 205-*a* may schedule a first downlink data transmission in slot 205-*b*; a second DCI message 225 received in the data region 215 of slot 205-*a* may schedule a second downlink data transmission in slot 205-*d*; a third DCI message 225 in the data region 215 of slot 205-*a* may schedule a third downlink data transmission in slot 205-*e*; and a fourth DCI message 225 in the data region 215 of slot 205-*a* may schedule a fourth downlink data transmission in slot 205-*g*. UE 115-*a* may decode the one or more shared channel DCI messages 225 and identify a set of resources for receiving or transmitting future data transmissions in one or more scheduled shared channels 230. The first, second, third, and fourth DCI messages 225 may be contiguous in frequency or time with at least one other of the first, second, third, and fourth DCI messages 225.

Figure 3:
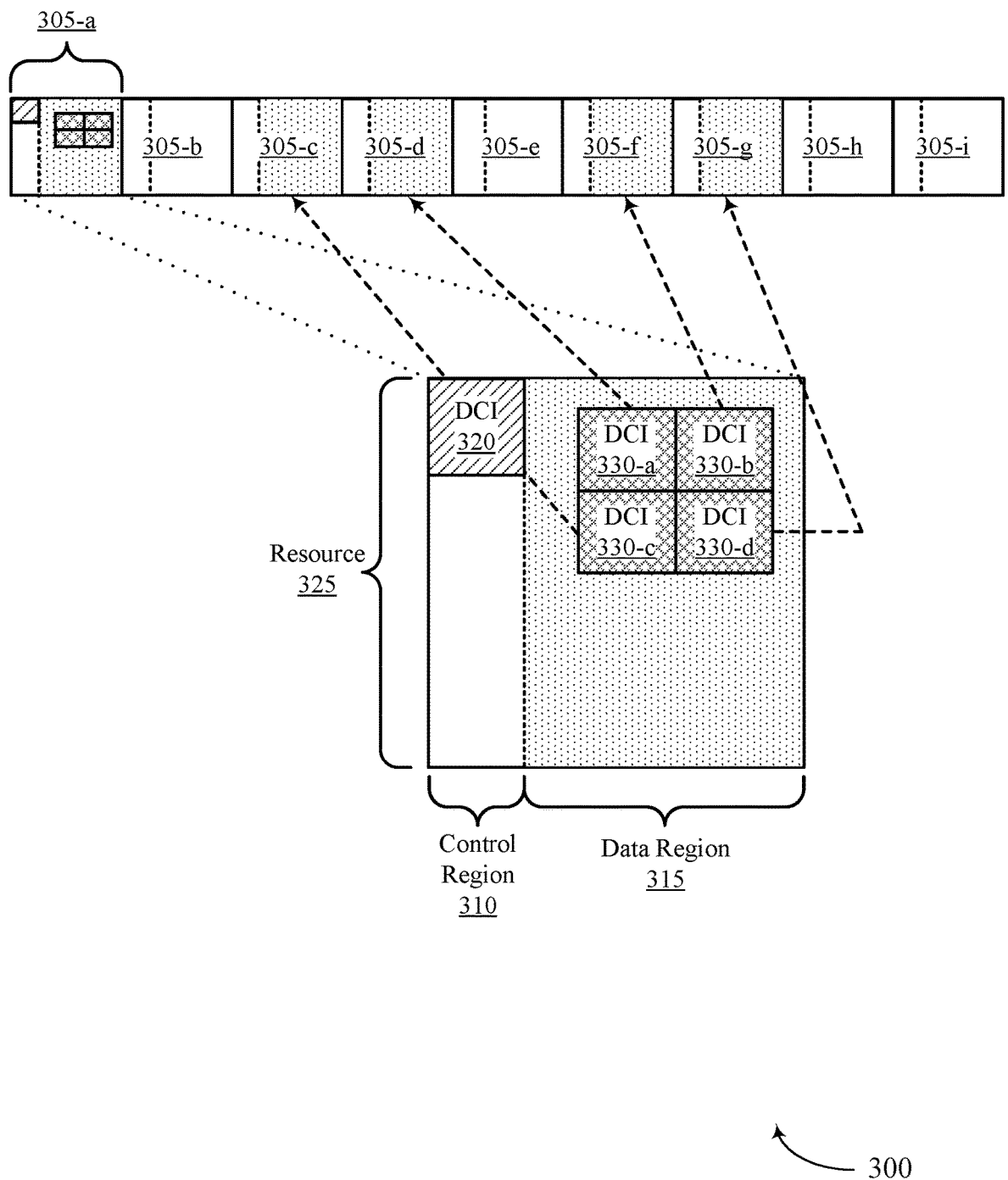
FIG. 3 illustrates an example of a resource map that supports layer mapping methods for piggybacked DCI in accordance with aspects of the present disclosure.

FIG. 3 illustrates an example of a resource map 300 that supports layer mapping methods for piggybacked DCI in accordance with aspects of the present disclosure. In some examples, resource map 300 may be implemented by aspects of wireless communications systems 100 and/or 200. Resource map 300 includes a number of slots 305 in the time domain in which a base station and a UE may communicate (e.g., a base station may transmit downlink messages to a UE). A slot 305 may include a control region 310 and a data region 315. The control region 310 may be used by a base station to transmit DCI messages (e.g., DCI message 320), while the data region 315 may be used to transmit data messages and, in some examples, DCI messages 330 piggybacked on a data channel.

A base station may transmit, to a UE, a DCI message 320. The DCI message 320 may include control information, scheduling information, demodulation reference signal (DMRS) information, a grant, or the like. The scheduling information may indicate that the UE is to communicate (e.g., transmit or receive transmissions to or from the base station) in a slot, such as slot 305-*a* in which the DCI message 320 is received, or a subsequent slot 305. In some cases, the base station may piggyback DCI information for the UE on resources assigned to a data region of the UE. For example, the base station 105 may transmit the DCI message 320 to the UE. The DCI message 320 may indicate scheduling resources 325 in which the UE may receive one or more additional DCI messages 330 in the data region 315 assigned to the UE. In some cases, the DCI message 320 (e.g., DCI message 320 in the CORESET of slot 305-*a*) may include shared channel DCI message 330 allocation information, the common parts of the multiple shared channel DCI messages 330, and a grant for the shared channel of slot 305-*a*.

In some implementations, the UE may be configured with multiple codewords, or layers, or both such that the data region 315 (e.g., shared channel) may support multiple codewords or layers. In such cases, the configuration of one or more DCI messages 330 in the data region 315 may be based on the number of layers the UE is configured with. In some implementations, each DCI message 330 may be mapped to a single layer. The one or more DCI messages 330 may be mapped to the layer with the higher MCS, or the layer that is associated with the highest SNR, or both of the available layers. In some cases, the DCI messages 330 may be mapped to the layer with the lowest index, such as if each layer has the same MCS, or SNR. In some cases, the payload associated of the four DCI messages 330, in this example, may be large. To mitigate large DCI payloads, a threshold may be configured. In some examples, if the payload of the four DCI messages 330 on one layer relative to the payload of the shared channel with the higher MCS or SNR is above a preconfigured or signaled threshold, then the DCI messages 330 may be split among multiple layers. In some cases, unrelated to MCS, and SNR, the DCI messages 330 may be mapped to multiple layers. For example, the DCI messages 330 may be mapped evenly on each available layer. For example, in the case of two layers and four DCI messages 330, two of the DCI messages 330 (e.g., DCI messages 330-*a* and 330-*b*, or some other combination of the DCI messages 330) may be mapped to a first layer and the two other DCI messages 330 (e.g., DCI messages 330-*c* and 330-*d*, or some other combination of the DCI messages 330) may be mapped to the second layer.

The one or more additional DCI messages 330 may include scheduling information for subsequent data communications. The scheduling information may indicate one or more subsequent data regions in which the UE may communicate, or another UE may communicate. For example, DCI message 330-*a* may schedule (e.g., provide a grant for) the UE to communicate in slot 305-*c*, DCI message 330-*b* may schedule the UE to communicate in slot 305-*d*, DCI message 330-*c* may schedule the UE to communicate in slot 305-*f*, and DCI message 330-*d* may schedule the UE to communicate in slot 305-*g*. The UE may communicate in each slot as indicated by the received DCI messages 330. Additionally or alternatively, the UE may refrain from communicating in other slots 305 in which the UE is not scheduled to communicate by a DCI message, such as slot 305-*e*. In some cases, other UEs may communicate in these slots 305 (e.g., slots 305 not assigned to the UE or multiplexed in a slot 305 with the UE). The UE may periodically monitor for control information. For example, the UE may monitor the control region 310 in slot 305-*a* to check for scheduling information for slots 305-*a* through 305-*g* (e.g., monitor for a CORESET, DCI, grant). The UE may then refrain from monitoring the control regions 310 in slots 305-*b* through 305-*g*, and then may monitor the control region 310 in slot 305-*h* (e.g., based on a static or dynamic periodicity for control channel monitoring). As such, the control region 310 monitoring density of the UE may be reduced which may mitigate power consumption at the UE and improve micro sleep procedures as the UE will identify whether to wake up for a particular slot based on the piggybacking DCI messages 330. The control region 310 in slot 305-*h* may schedule data communications for the UE for slot 305-*h*, slot 305-*i*, and the subsequent slots until the next control channel monitoring opportunity.

Figure 4:
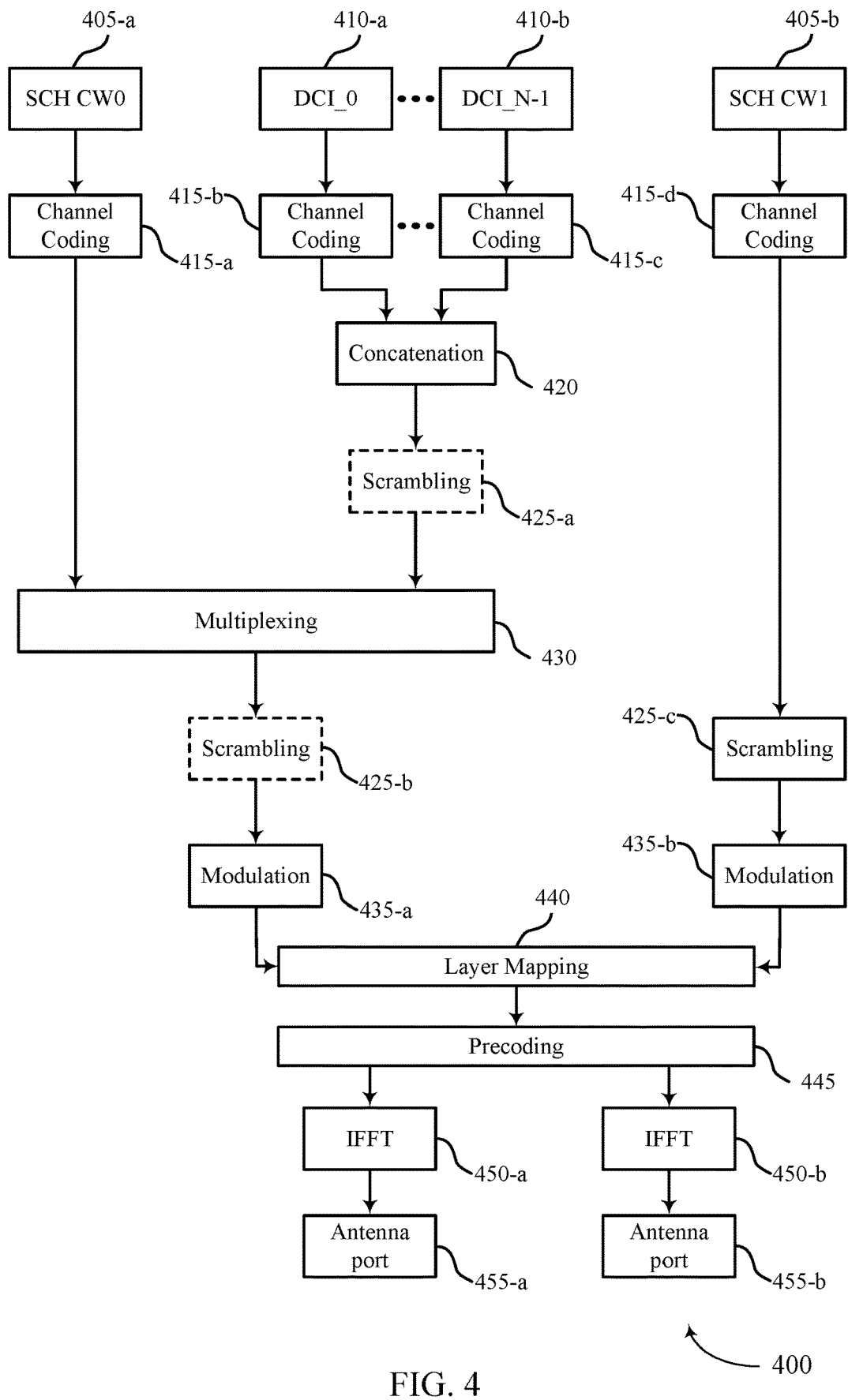
FIGS. 4 through 6 illustrate examples of DCI piggybacking schemes that support layer mapping methods for piggybacked DCI in accordance with aspects of the present disclosure.

FIG. 4 illustrates an example of a DCI piggybacking scheme 400 that supports layer mapping methods for piggybacked DCI in accordance with aspects of the present disclosure. In some examples, DCI piggybacking scheme 400 may be implemented by aspects of wireless communications systems 100 and/or 200. In some cases, as described with reference to FIGS. 2 and 3, a UE may be configured with multiple layers, or codewords, or both. Codewords and layers may be used interchangeably. For instance, DCI piggybacking scheme 400 may represent a process by which a base station may configure downlink shared channel messages 405 (e.g., shared channel messages 405-*a*, and 405-*b*) and N DCI messages 410 (e.g., DCI messages 410-*a*, and 410-*b*) piggybacked on one or more layers of a downlink shared channel in which the downlink shared channel message 405 resides. In some cases, the base station may configure any number of DCI messages in between DCI messages 410-*a* and 410-*b*.

In some implementations, a base station may be configured to map piggybacking DCI messages (e.g., DCI messages 410-*a*, and 410-*b*), or concatenated DCI messages 410 on a single layer supported by a UE. The base station may determine which layer to map the DCI messages 410 to. In some implementations, the layer may be chosen based on the MCS, SNR, or some other metric of the layer. For example, prior to DCI mapping, the base station may transmit one or more reference signals to the UE. The UE may receive and measure the reference signals on the UEs one or more layers. For example, the UE may measure reference signal received power (RSRP), reference signal received quality (RSRQ), SNR, or perform some other measurement of the received reference signal and determine the quality of each layer. The UE may indicate the quality of the one or more layers in a channel state information (CSI) report that the UE transmits to the base station. The CSI report may include a rank indicator (RI), a precoding matrix indicator (PMI), or a channel quality indicator (CQI), or a combination thereof. The base station may receive the CSI report and determine the rank of the layers with regard to quality. The base station may allocate a higher MCS to layers of higher quality.

Control information may be configured to have a higher quality (e.g., lower block error rate (BLER)) compared to data transmissions in a shared channel because the shared channel may utilize error correction schemes (e.g., hybrid ARQ), while the control information may not. As such, the base station may map the DCI messages 410 to the layer associated with the highest quality (e.g., the layer allocated the highest MCS, or associated with the highest SNR) to ensure high reliability. In some cases, such as cases of poor granularity in one example, each layer may have the same MCS or SNR. In such cases, the base station may map the DCI messages to the layer with the lowest index value (e.g., layer 0, codeword 0). In some cases, shared channel message 405-*a* may be mapped to the highest quality layer, or the layer with the lowest index, or a combination thereof. As such, base station 105-*a* may map DCI messages 410-*a* and 410-*b* to the same layer as shared channel message 405-*a*. In some cases, shared channel message 405-*b* may be mapped to a lower quality channel, or a channel with a higher index, or a combination thereof.

At 415-*a*, a base station may perform channel coding on the downlink shared channel message 405. Similarly, the base station may perform channel coding for each of the N DCI messages 410. For instance, at 415-*b* and 415-*c*, the base station 105 may perform channel coding on a first DCI message 410-*a* and a second DCI message 410-*b*. The base station may perform channel coding for shared channel message 405-*b* at 415-*d*. Upon performing channel coding for each of the N DCI messages 410, the base station 105 may concatenate the N channel coded DCI messages 410 together at 420.

In some implementations, the base station may scramble the concatenated DCI messages 410 at 425-*a*. In some other implementations, the base station may scramble the messages at 425-*a* after multiplexing at 430. In one example, the base station may scramble the concatenated DCI messages 410 at 425-*a* and multiplex the scrambled messages with the shared channel message 405-*a* at 430. The base station may then modulate the multiplexed DCI messages 410 and shared channel message 405-*a* at 435-*a*. In another example, the base station may multiplex the concatenated messages 420 with the shared channel message 405-*a* at 430, and scramble the multiplexed messages at 425-*b*. The base station may then modulate the scrambled messages at 435-*a*. Concurrently, the base station may scramble shared channel message 405-*b* at 425-*c*, and modulate the scrambled message at 435-*b*.

At 425, the base station 105 may multiplex the N concatenated DCI messages 410 with the channel coded downlink shared channel message 405. At 430, the base station 105 may scramble the multiplexed messages according to a UE-specific scrambling sequence. At 435, the base station 105 may modulate the scrambled messages and may transmit the modulated messages to a UE as a set of coded bits.

Following modulation, the base station may perform layer mapping at 440, and precoding at 445. The base station may split the precoding, and perform inverse fast Fourier transform 450-*a* and 450-*b* and may be transmitted by antenna ports 455-*a* and 455-*b*, respectively.

Figure 5:
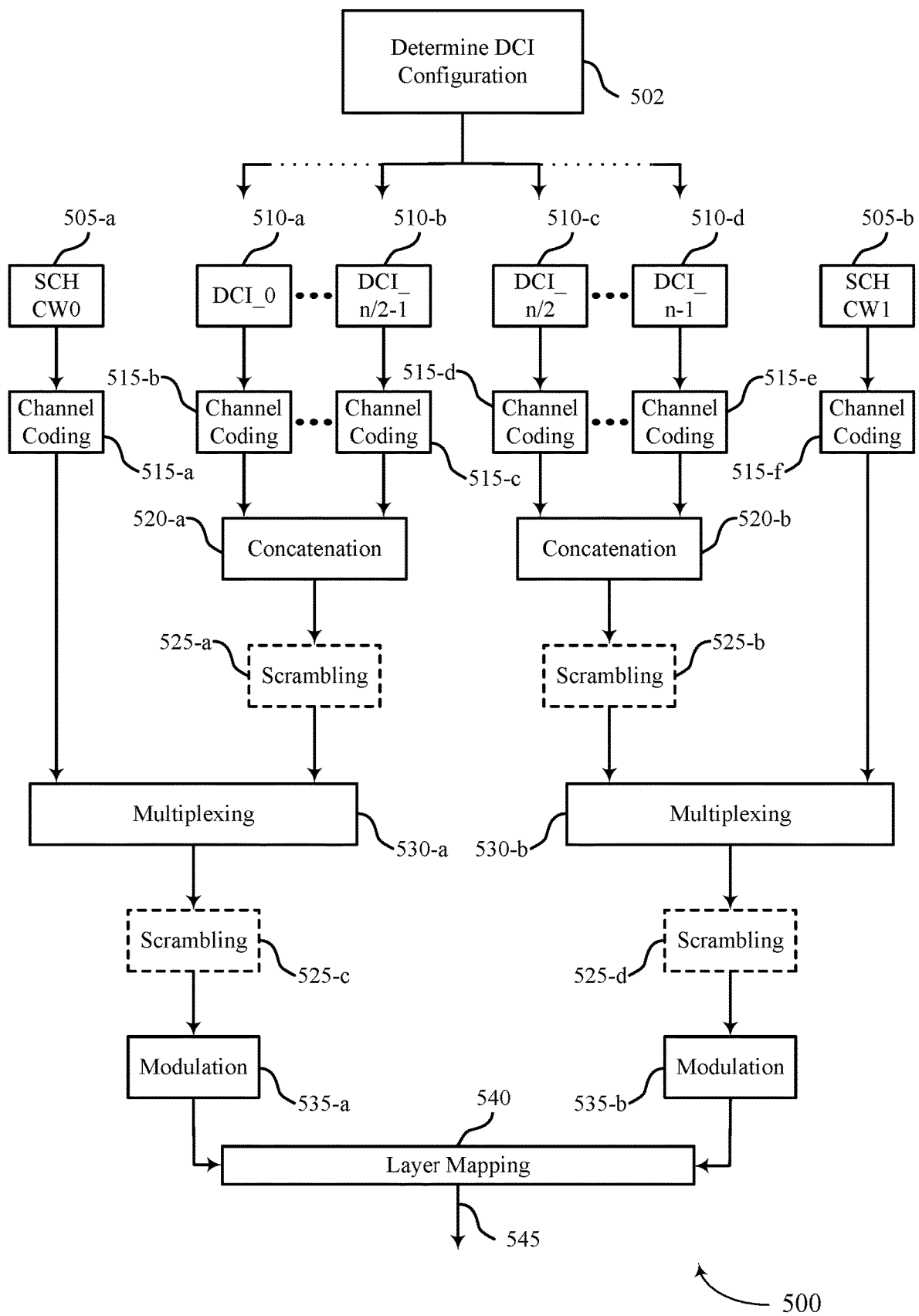

FIG. 5 illustrates an example of a DCI piggybacking scheme 500 that supports layer mapping methods for piggybacked DCI in accordance with aspects of the present disclosure. In some examples, DCI piggybacking scheme 500 may be implemented by aspects of wireless communications systems 100 and/or 200. In some cases, as described with reference to FIGS. 2 and 3, a UE may be configured with multiple layers, or codewords, or both. Codewords and layers may be used interchangeably. For instance, DCI piggybacking scheme 500 may represent a process by which a base station may configure downlink shared channel messages 505 (e.g., shared channel messages 505-*a*, and 505-*b*) and N DCI messages 510 (e.g., DCI messages 510-*a*, 510-*b*, 510-*c*, and 510-*d*) piggybacked on one or more layers of a downlink shared channel in which the downlink shared channel message 505 resides. In some cases, the base station may configure any number of DCI messages in between DCI messages 510-*a* and 510-*b* and between DCI messages 510.

In some implementations, a base station may be configured to mitigate large DCI payloads. To reduce the payload of the piggybacking DCI messages 510 and mitigate the impact on the shared channel, a payload ratio and threshold may be configured, where the number of DCI messages 510 that may be mapped to a single layer may depend on the threshold. For example, if the payload of all DCI messages 510 relative to the payload of the higher MCS or SNR shared channel payload is above a threshold $$\left(e.g., \frac{\text{piggyback } DCI \text{ payload}}{\text{higher } MCS \text{ or } SNR \text{ shared channel payload}} > \delta,\right)$$

where δ is preconfigured or signaled by the base station or network, then all of the DCI messages 510 may not be mapped to a single layer. Rather, a subset of the DCI messages 510 may be placed on one layer, and a subset of the DCI messages may be placed on another layer.

The base station may determine whether the DCI payload satisfies (e.g., exceeds) the threshold at 502. Based on the determination, the base station may map the DCI messages 510 to one or more layers. If the DCI payload relative to the shared channel payload associated on the layer with the higher MCS or SNR is less than or equal to the threshold, then the DCI messages 510 may be mapped to the signal layer. If the DCI payload relative to the shared channel payload associated on the layer with the higher MCS or SNR is greater than the threshold, then the DCI messages 510 may be split between multiple layers. The DCI messages 510 may be split un-evenly across the layers. In some cases, the same number of DCI messages 510 that pushed the payload ratio above the threshold may be mapped to the layer with the second highest MCS or SNR, or the second lowest index of the available layers, or some other number of DCI messages 510 may be mapped to one or more different layers. In some implementations, the threshold, δ, may be preconfigured. In some implementations, the threshold, δ, may be signaled by the network or base station dynamically (e.g., via DCI or MAC CE signaling), semi-statically (e.g., via RRC signaling), or aperiodically (e.g., via RRC signaling).

In one example, the DCI payload associated with DCI messages 510-a, 510-b, 510-c, and 510-d may exceed the threshold. In some cases, DCI messages 510-a, 510-b, and 510-c may also exceed the threshold. As such, DCI messages 510-a and 510-b may be mapped to the layer with the higher MCS or SNR, or lowest index, and DCI messages 510-c and 510-d may be mapped to the layer with a lower MCS or SNR, or higher index, or vice versa.

At 515 (e.g., 515-a through 515-f), the base station may perform channel coding for each of the shared channel messages 505 and each of the DCI messages 510. At 520, the base station may concatenate the DCI messages 510 on each layer. For example, the base station may concatenate DCI messages 510-a and 510-b on a first layer at 520-a, and concatenate DCI messages 510-c and 510-d on a second layer at 520-b. As described with reference to FIG. 4, the base station may scramble the messages before or after multiplexing. For example, the base station may scramble the concatenated DCI messages 510 at 525-a and 525-b, or scramble the multiplexed DCI messages 510 and shared channel messages 505 at 525-c and 525-d. Based on when scrambling is performed, the base station may multiplex the scrambled DCI messages 510 with the shared channel message 505 at 530-a and 530-b, or the base station may multiplex the concatenated DCI messages 510 with the shared channel message 505 at 530-a and 530-b. Following scrambling at 525-c and 525-d, or multiplexing at 530-a and 530-b, the base station may perform modulation at 535-a and 535-b, and layer mapping at 540 prior to further procedures at 545, such as precoding, IFFT, and transmission through antenna ports, as described with reference to FIG. 4.

Figure 6:
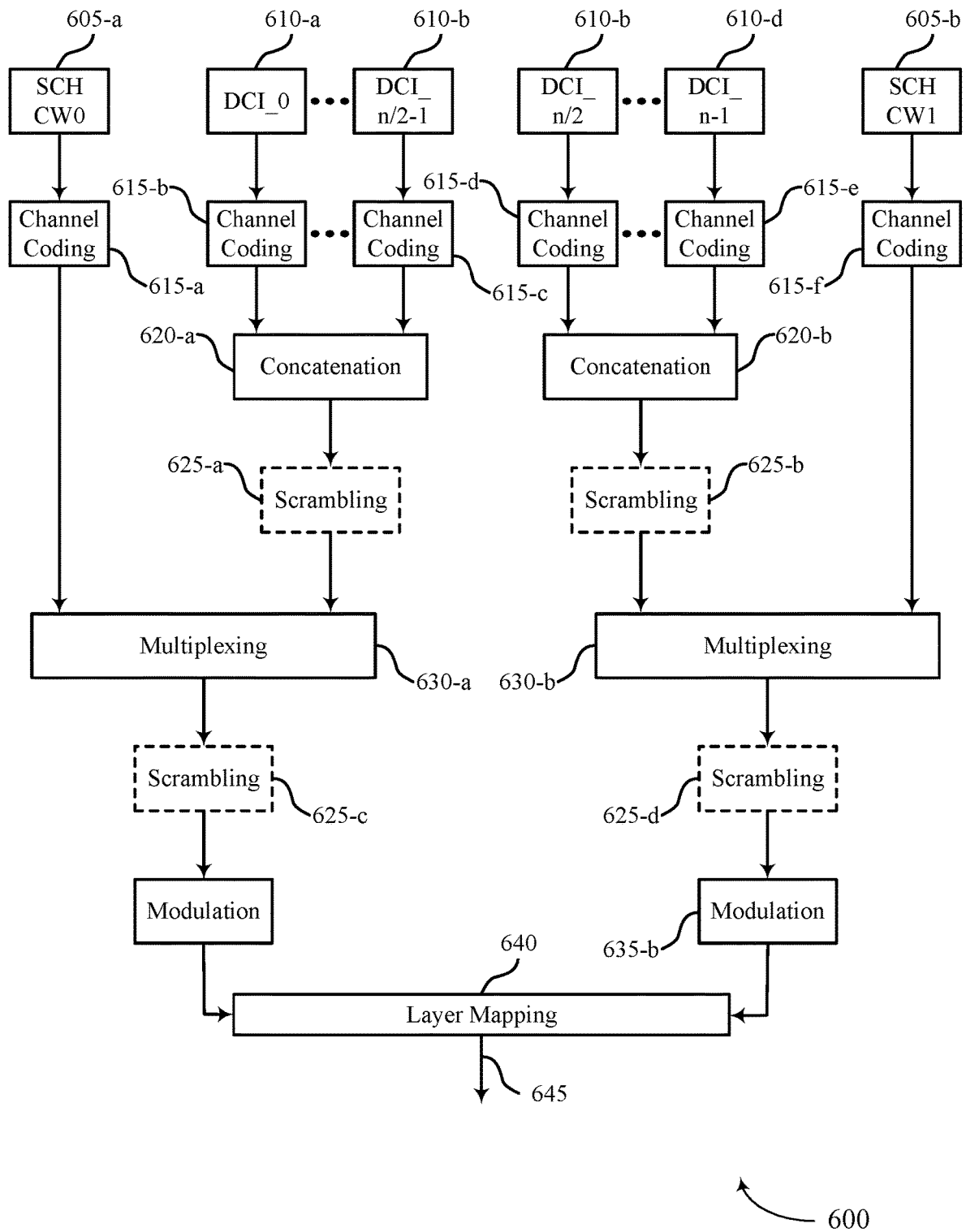

FIG. 6 illustrates an example of a DCI piggybacking scheme 600 that supports layer mapping methods for piggybacked DCI in accordance with aspects of the present disclosure. In some examples, DCI piggybacking scheme 600 may be implemented by aspects of wireless communications systems 100 and/or 200. In some cases, as described with reference to FIGS. 2 and 3, a UE may be configured with multiple layers, or codewords, or both. Codewords and layers may be used interchangeably. For instance, DCI piggybacking scheme 600 may represent a process by which a base station may configure downlink shared channel messages 605 (e.g., shared channel messages 605-a, and 605-b) and N DCI messages 610 (e.g., DCI messages 610-a, 610-b, 610-c, and 610-d) piggybacked on one or more layers of a downlink shared channel in which the downlink shared channel message 605 resides. In some cases, the base station may configure any number of DCI messages in between DCI messages 610-a and 610-b and between DCI messages 610.

In some implementations, the base station may be configured to map the DCI messages 610 across multiple layers. The base station may be configured to map the DCI messages 610 evenly across the available layers. For example, if the UE is configured with two layers and the base station has four DCI messages 610 to map, then two of the DCI messages 610 may be placed on a first layer and two of the DCI messages may be placed on a second layer. DCI messages 510-a and 510-b may be mapped to a first layer, and DCI messages 510-c and 510-d may be mapped to a second layer, or vice versa.

In some cases, the DCI messages 610 may not be evenly divided across the available layers. For example, the UE may be configured with two layers, and the base station may have three DCI messages 610 to map. In some implementations, the base station may be configured to unevenly map the DCI messages 610 across the layers, such that one of the layers has one extra DCI message 610 than the other layer, or layers. For example, the base station may map two DCI messages 610 to a first layer, and map the other DCI message 610 to a second layer. In some implementations, the base station may be configured to divide the remaining DCI message, that cannot be evenly divided, across the two layers. For example, the base station may map one DCI message 610 to a first layer, a second DCI message to a second layer, and split the third DCI message 610 evenly such that a first subset of bits of the third DCI message 610 are mapped to the first layer and a second subset of bits of the third DCI message 610 are mapped to the second layer. In some implementations, if the DCI messages 610 cannot be evenly divided across the available layers, the base station may be configured to concatenate the DCI messages 610 and evenly split the concatenated messages across the available layers.

In the example depicted in FIG. 6, the DCI messages 610 may be evenly mapped across the two available layers supported by the UE. At 615 (e.g., 615-a through 615-f), the base station may perform channel coding for each of the shared channel messages 605 and each of the DCI messages 610. At 620, the base station may concatenate the DCI messages 610 on each layer. For example, the base station may concatenate DCI messages 610-a and 610-b on a first layer at 620-a, and concatenate DCI messages 610-c and 610-d on a second layer at 620-b. As described with reference to FIG. 4, the base station may scramble the messages before or after multiplexing. For example, the base station may scramble the concatenated DCI messages 610 at 625-a and 625-b, or scramble the multiplexed DCI messages 610 and shared channel messages 605 at 625-c and 625-d. Based on when scrambling is performed, the base station may multiplex the scrambled DCI messages 610 with the shared channel message 605 at 630-a and 630-b, or the base station may multiplex the concatenated DCI messages 610 with the shared channel message 605 at 630-a and 630-b. Following scrambling at 625-c and 625-d, or multiplexing at 630-a and 630-b, the base station may perform modulation at 635-a and 635-b, and layer mapping prior to further procedures at 645, such as precoding, IFFT, and transmission through antenna ports, as described with reference to FIG. 4.

Figure 7:
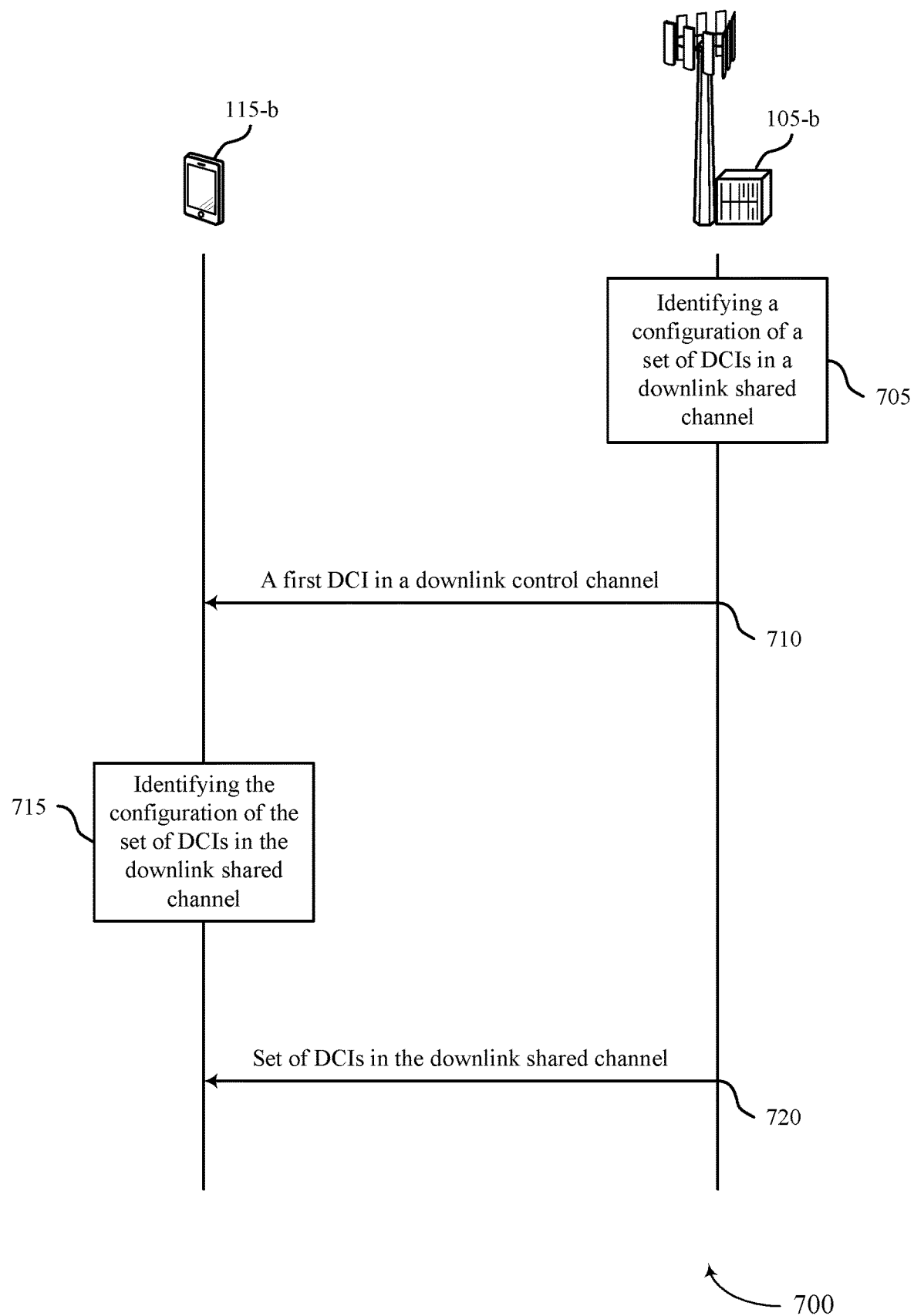
FIG. 7 illustrates an example of a process flow that supports layer mapping methods for piggybacked DCI in accordance with aspects of the present disclosure.

FIG. 7 illustrates an example of a process flow 700 that supports layer mapping methods for piggybacked DCI in accordance with aspects of the present disclosure. The process flow 700 may illustrate an example DCI piggybacking procedure. For example, base station 105-b may determine a DCI piggybacking configuration and signal the configuration to UE 115-b. Base station 105-b and UE 115-b may be examples of the corresponding wireless devices described with reference to FIGS. 1 through 6. In some cases, instead of base station 105-b implementing the DCI piggybacking procedure, a different type of wireless device (e.g., a UE 115) may determine a DCI piggybacking configuration. Alternative examples of the following may be implemented, where some steps are performed in a different order than described or are not performed at all. In some cases, steps may include additional features not mentioned below, or further steps may be added.

At 705, base station 105-b may identify, for UE 115-b, a configuration for receiving a set of DCI messages on one or more layers of a set of layers of a downlink shared channel. At 710, UE 115-b may receive a first DCI message in a downlink control channel, the first DCI message scheduling first resources of a downlink shared channel for a set of DCI messages.

At 715, UE 115-b may identify a configuration for receiving the set of DCI messages on one or more layers of a set of layers of the downlink shared channel based on the first DCI message. In some implementations, UE 115-a may identify that that the set of DCI messages are mapped to a single layer of the set of layers, where the one or more layers include the single layer. The DCI messages may be mapped to the single layer based on the single layer having a highest MCS, SNR, or both for the set of layers. The DCI messages may be mapped to the single layer based on the single layer having a lowest index value for the set of layers.

In some implementations, the set of DCI messages are mapped to the single layer based on a comparison of a first payload size of the set of DCI messages mapped to the single layer to a second payload size of the downlink shared channel mapped to the single layer. In some cases, the MCS associated with the downlink shared channel for the single layer is a highest MCS for the downlink shared channel for the set of layers.

In some implementations, UE 115-b may identify that the set of DCI messages are mapped to multiple layers of the set of layers based on a comparison of a first payload size of the set of DCI messages to a second payload size of the downlink shared channel. In some cases, an MCS associated with the second payload size of the downlink shared channel is a highest MCS for the downlink shared channel for the set of layers.

In some implementations, UE 115-a may identify that the set of DCI messages are mapped to multiple layers of the set of layers, and identify, for each layer of the multiple layers, that a first number of DCI messages of the set of DCI messages mapped to the layer is no more than one different than a second number of DCI messages of the set of DCI messages mapped to any other layer of the multiple layers. In some cases, the first number of DCI messages is a same number for each layer of the multiple layers. In some cases, the first number of DCI messages for the layer is a different number than the second number of DCI messages for at least one other layer of the multiple layers. In some cases, the first number of DCI messages includes a first portion of a second DCI message, and the second number of DCI messages includes a second portion of the second DCI message.

At 720, UE 115-b may receive the set of DCI messages on the one or more layers of the downlink shared channel based on the identified configuration. In some cases, the set of DCI messages are concatenated on the one or more layers.

Figure 8:
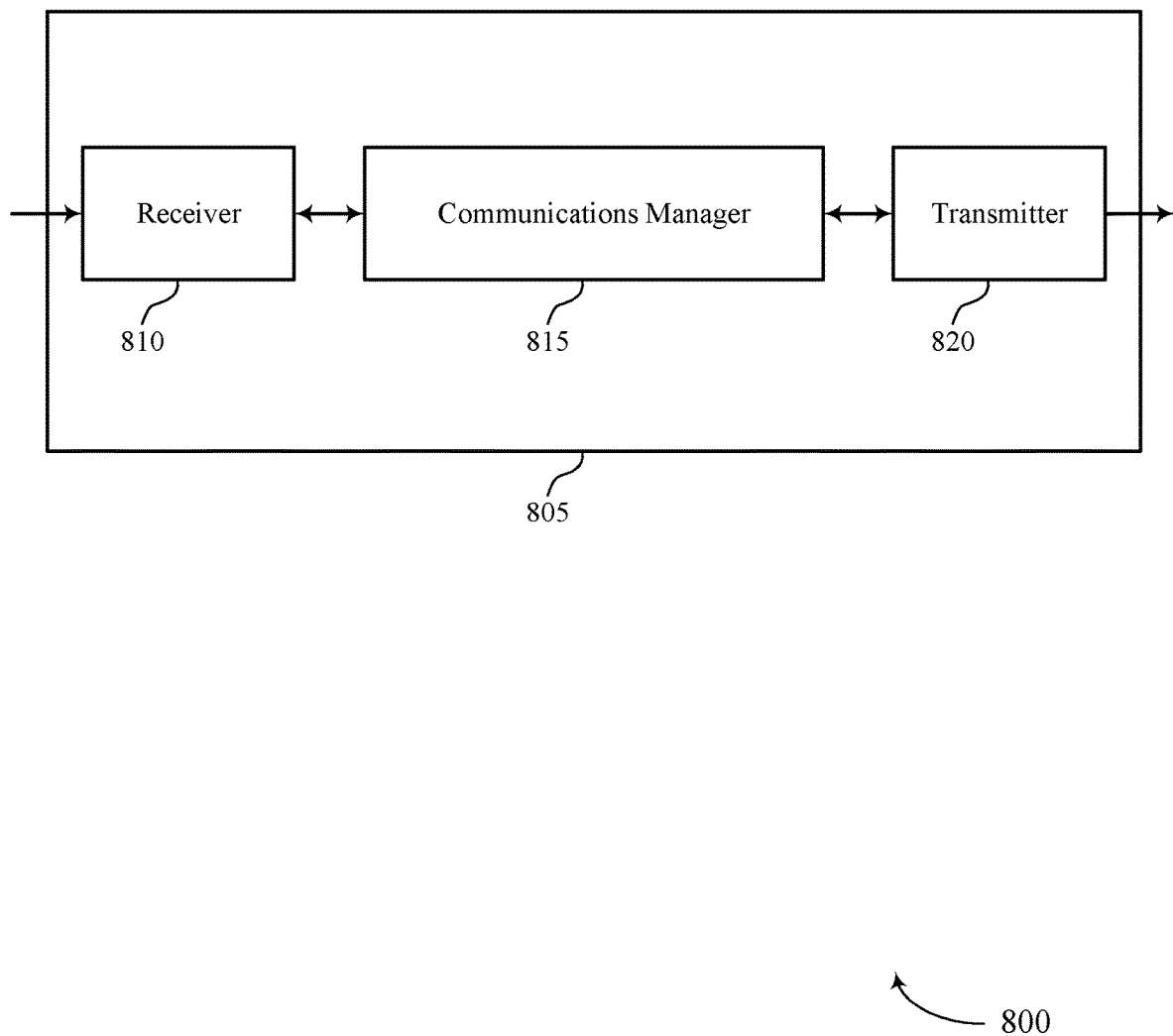
FIGS. 8 and 9 show block diagrams of devices that support layer mapping methods for piggybacked DCI in accordance with aspects of the present disclosure.

FIG. 8 shows a block diagram 800 of a device 805 that supports layer mapping methods for piggybacked DCI in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to layer mapping methods for piggybacked DCI, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a first DCI message in a downlink control channel, the first DCI message scheduling first resources of a downlink shared channel for a set of DCI messages, identify a configuration for receiving the set of DCI messages on one or more layers of a set of layers of the downlink shared channel based on the first DCI message, and receive the set of DCI messages on the one or more layers of the downlink shared channel based on the identified configuration. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

The communications manager 815 as described herein may be implemented to realize one or more potential advantages. One implementation may allow the device 805 to improve piggybacking configurations to support UEs supporting multiple layers or codewords. For example, a device 805 may receive a configuration for receiving piggybacking DCIs on one or more layers of a downlink shared channel, where the configuration may mitigate power consumption, and DCI payload size.

Based on implementing the piggybacking DCI configuration techniques as described herein, a processor of a UE 115 (e.g., controlling the receiver 810, the transmitter 820, or the transceiver 1120 as described with reference to FIG. 11) may increase efficiency in scheduling data in downlink shared channels as the control information may be received in one slot over multiple layers.

Figure 9:
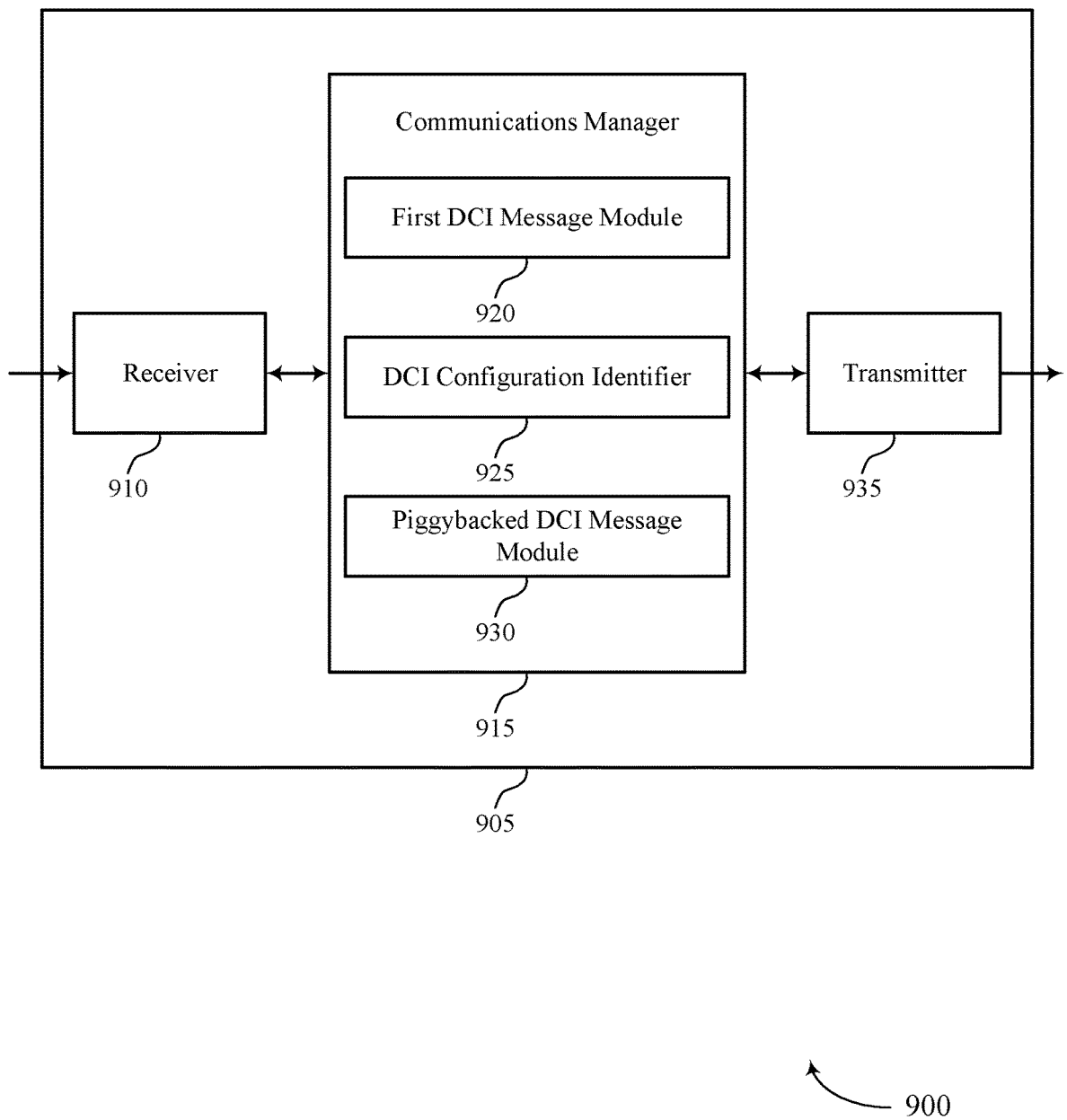

FIG. 9 shows a block diagram 900 of a device 905 that supports layer mapping methods for piggybacked DCI in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to layer mapping methods for piggybacked DCI, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a first DCI message module 920, a DCI configuration identifier 925, and a piggybacked DCI message module 930. The communications manager 915 may be an example of aspects of the communications manager 1110 described herein.

The first DCI message module 920 may receive a first DCI message in a downlink control channel, the first DCI message scheduling first resources of a downlink shared channel for a set of DCI messages. The DCI configuration identifier 925 may identify a configuration for receiving the set of DCI messages on one or more layers of a set of layers of the downlink shared channel based on the first DCI message. The piggybacked DCI message module 930 may receive the set of DCI messages on the one or more layers of the downlink shared channel based on the identified configuration.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
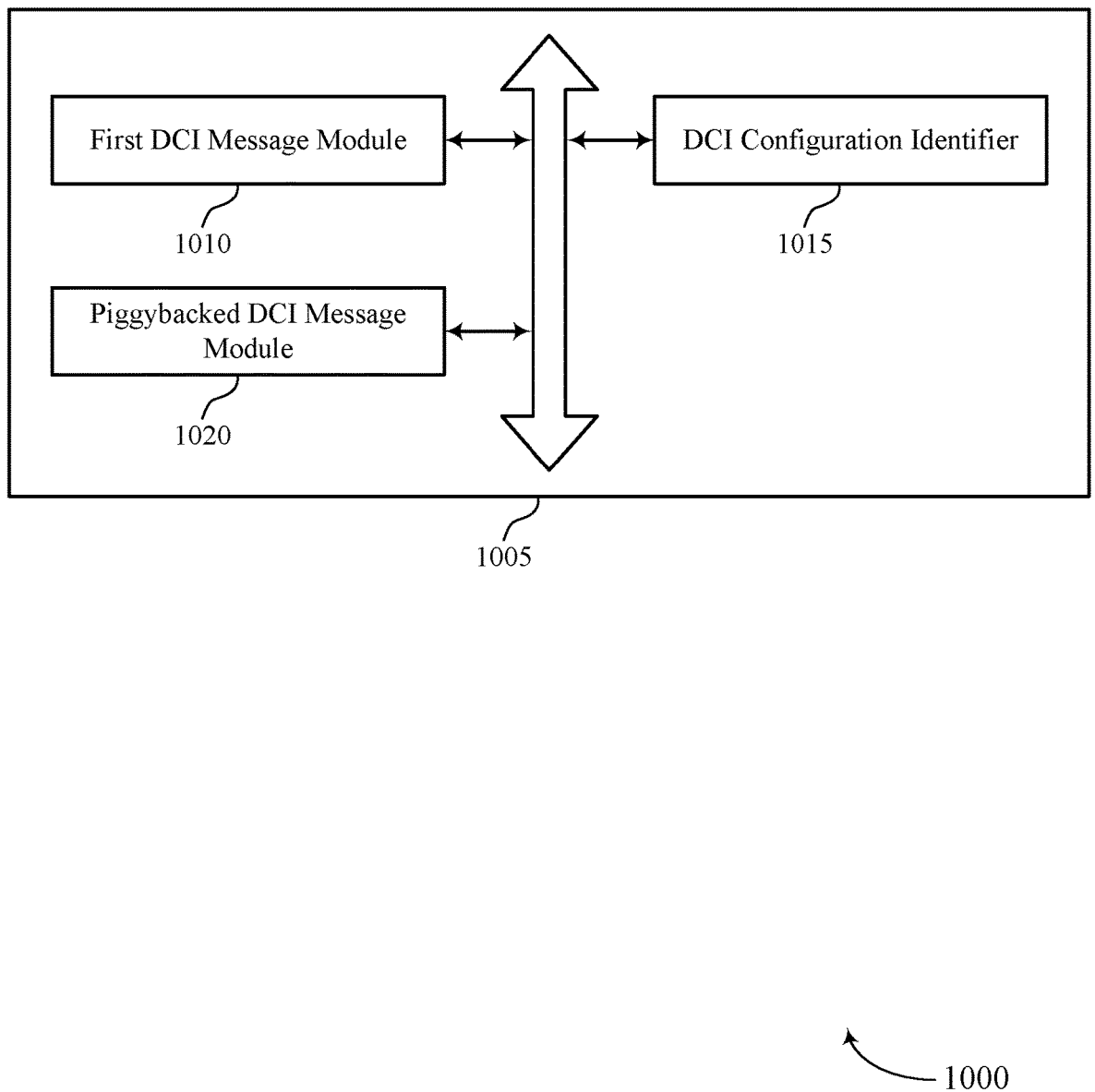
FIG. 10 shows a block diagram of a communications manager that supports layer mapping methods for piggybacked DCI in accordance with aspects of the present disclosure.

FIG. 10 shows a block diagram 1000 of a communications manager 1005 that supports layer mapping methods for piggybacked DCI in accordance with aspects of the present disclosure. The communications manager 1005 may be an example of aspects of a communications manager 815, a communications manager 915, or a communications manager 1110 described herein. The communications manager 1005 may include a first DCI message module 1010, a DCI configuration identifier 1015, and a piggybacked DCI message module 1020. Each of these modules may communicate, directly or indirectly, with one another (e.g., via one or more buses).

The first DCI message module 1010 may receive a first DCI message in a downlink control channel, the first DCI message scheduling first resources of a downlink shared channel for a set of DCI messages. The DCI configuration identifier 1015 may identify a configuration for receiving the set of DCI messages on one or more layers of a set of layers of the downlink shared channel based on the first DCI message. The piggybacked DCI message module 1020 may receive the set of DCI messages on the one or more layers of the downlink shared channel based on the identified configuration.

In some examples, the DCI configuration identifier 1015 may identify that the set of DCI messages are mapped to a single layer of the set of layers, where the one or more layers include the single layer. In some cases, the set of DCI messages are mapped to the single layer based on the single layer having a highest MCS for the set of layers. In some cases, the set of DCI messages are mapped to the single layer based on the single layer having a highest SNR for the set of layers. In some cases, the set of DCI messages are mapped to the single layer based on the single layer having a lowest index value for the set of layers.

In some examples, the DCI configuration identifier 1015 may identify a ratio of a first payload size of the set of DCI messages mapped to the single layer to a second payload size of the downlink shared channel mapped to the single layer. In some examples, the DCI configuration identifier 1015 may determine that the ratio fails to satisfy a threshold value, where the set of DCI messages are mapped to the single layer based on the determining. In some cases, an MCS associated with the downlink shared channel for the single layer is a highest MCS for the downlink shared channel for the set of layers.

In some examples, the DCI configuration identifier 1015 may identify a ratio of a first payload size of the set of DCI messages mapped to a single layer of the set of layers to a second payload size of the downlink shared channel mapped to the single layer. In some examples, the DCI configuration identifier 1015 may determine that the ratio satisfies a threshold value, where the set of DCI messages are mapped to multiple layers of the set of layers based on the determining. In some cases, the set of DCI messages are mapped to the single layer based on the single layer having a highest MCS for the set of layers.

In some examples, the DCI configuration identifier 1015 may identify that the set of DCI messages are mapped to multiple layers of the set of layers. In some examples, the DCI configuration identifier 1015 may identify, for each layer of the multiple layers, that a first number of DCI messages of the set of DCI messages mapped to the layer is no more than one different than a second number of DCI messages of the set of DCI messages mapped to any other layer of the multiple layers.

In some cases, the first number of DCI messages is a same number for each layer of the multiple layers. In some cases, the first number of DCI messages for the layer is a different number than the second number of DCI messages for at least one other layer of the multiple layers. In some cases, the first number of DCI messages includes a first portion of a second DCI message, and the second number of DCI messages includes a second portion of the second DCI message. In some cases, the set of DCI messages are concatenated on the one or more layers.

Figure 11:
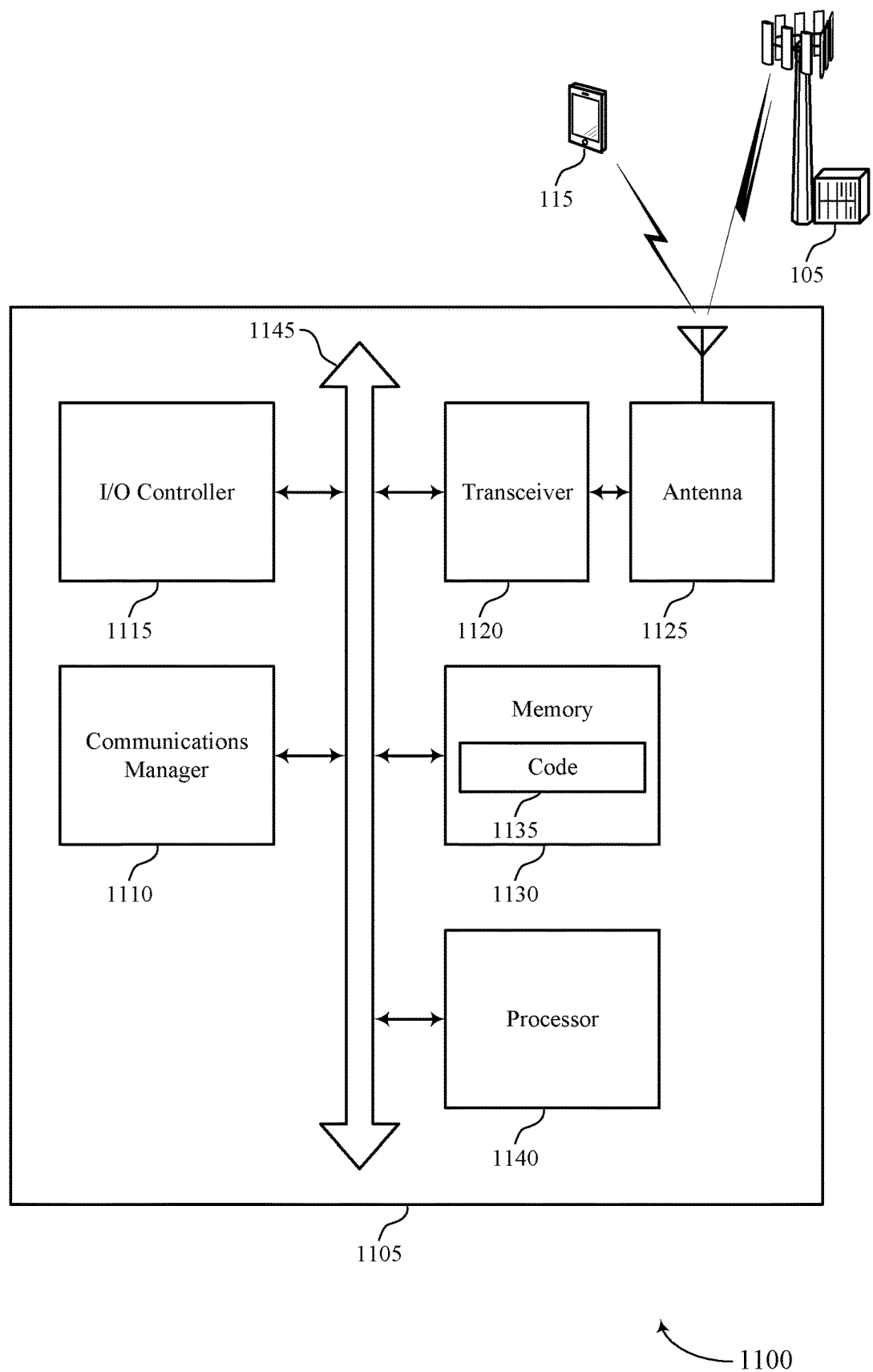
FIG. 11 shows a diagram of a system including a device that supports layer mapping methods for piggybacked DCI in accordance with aspects of the present disclosure.

FIG. 11 shows a diagram of a system 1100 including a device 1105 that supports layer mapping methods for piggybacked DCI in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a first DCI message in a downlink control channel, the first DCI message scheduling first resources of a downlink shared channel for a set of DCI messages, identify a configuration for receiving the set of DCI messages on one or more layers of a set of layers of the downlink shared channel based on the first DCI message, and receive the set of DCI messages on the one or more layers of the downlink shared channel based on the identified configuration.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting layer mapping methods for piggybacked DCI).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
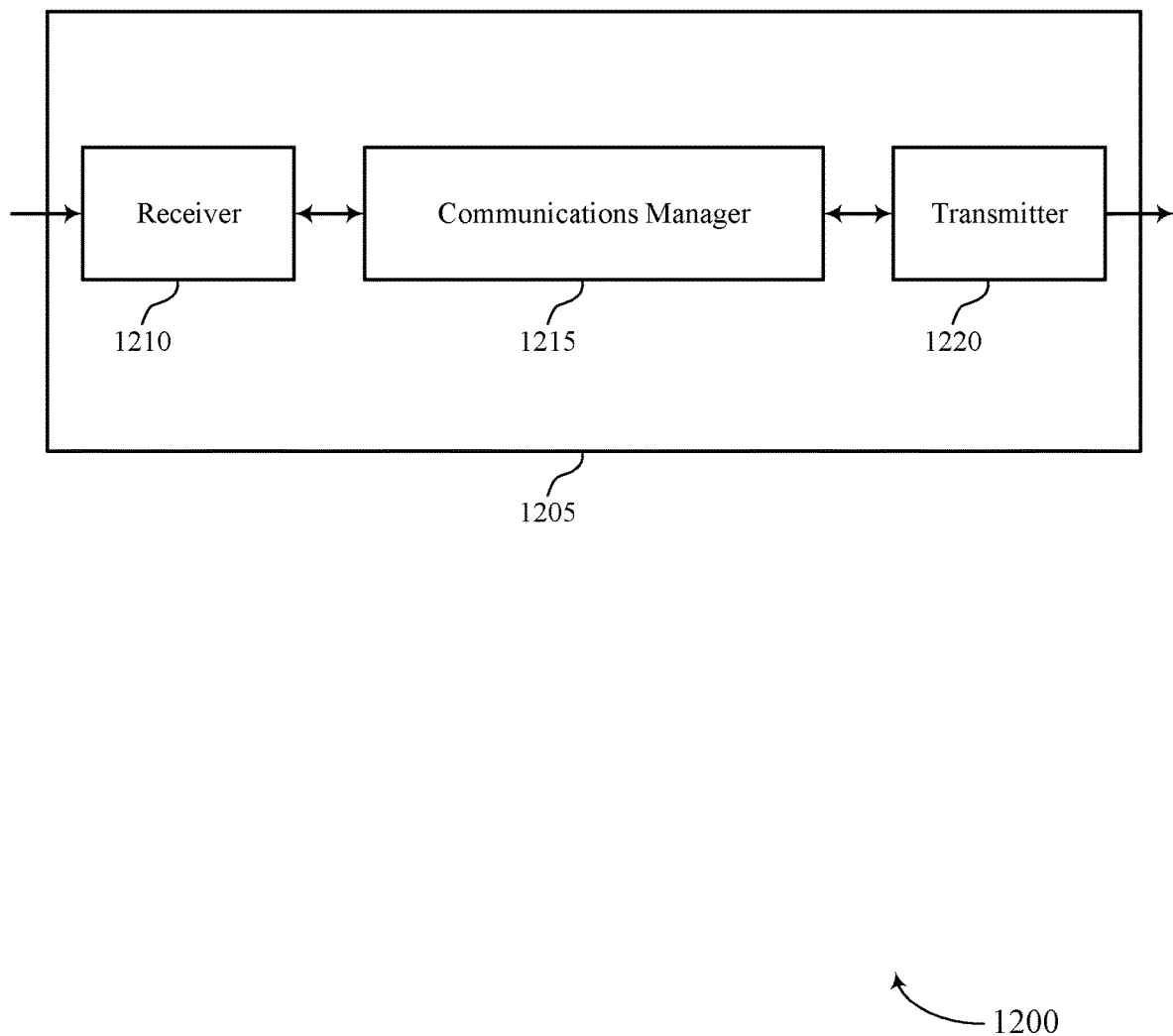
FIGS. 12 and 13 show block diagrams of devices that support layer mapping methods for piggybacked DCI in accordance with aspects of the present disclosure.

FIG. 12 shows a block diagram 1200 of a device 1205 that supports layer mapping methods for piggybacked DCI in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to layer mapping methods for piggybacked DCI, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify, for a UE, a configuration for receiving a set of DCI messages on one or more layers of a set of layers of a downlink shared channel, transmit, to the UE, a first DCI message in a downlink control channel, the first DCI message scheduling first resources of the downlink shared channel for the set of DCI messages, and transmit, to the UE, the set of DCI messages on the one or more layers of the downlink shared channel based on the identified configuration. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
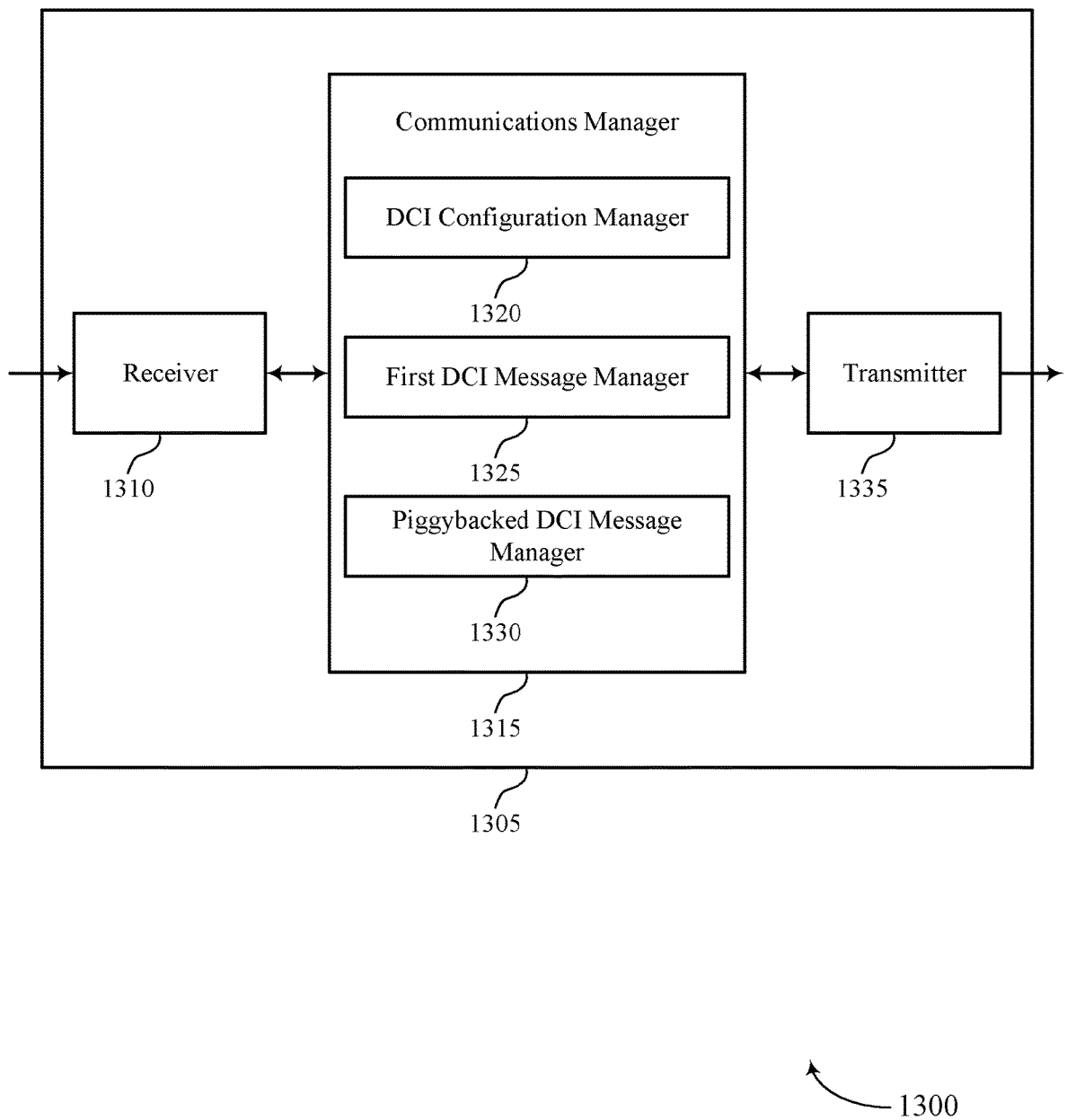

FIG. 13 shows a block diagram 1300 of a device 1305 that supports layer mapping methods for piggybacked DCI in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to layer mapping methods for piggybacked DCI, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a DCI configuration manager 1320, a first DCI message manager 1325, and a piggybacked DCI message manager 1330. The communications manager 1315 may be an example of aspects of the communications manager 1510 described herein.

The DCI configuration manager 1320 may identify, for a UE, a configuration for receiving a set of DCI messages on one or more layers of a set of layers of a downlink shared channel. The first DCI message manager 1325 may transmit, to the UE, a first DCI message in a downlink control channel, the first DCI message scheduling first resources of the downlink shared channel for the set of DCI messages. The piggybacked DCI message manager 1330 may transmit, to the UE, the set of DCI messages on the one or more layers of the downlink shared channel based on the identified configuration.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
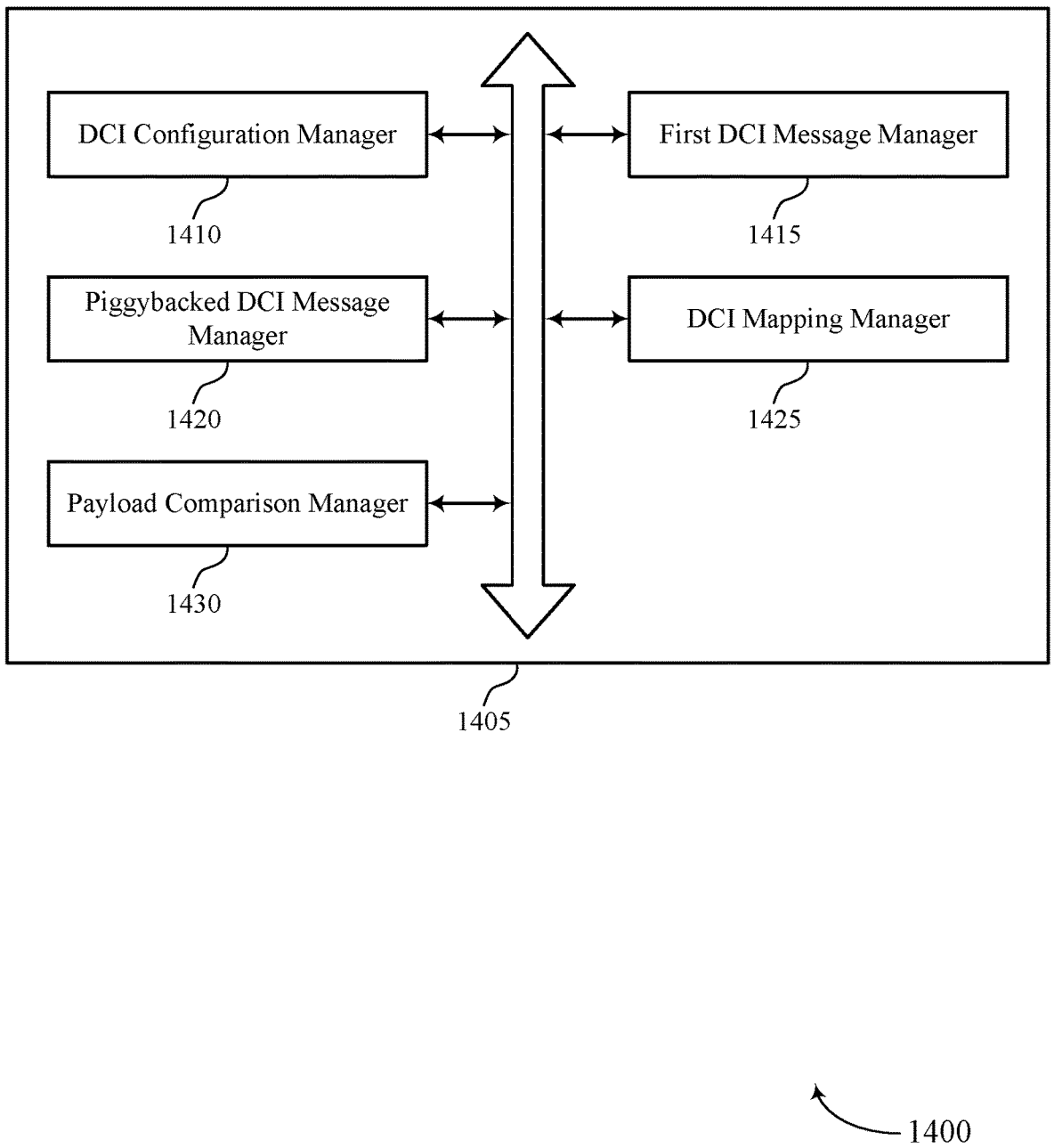
FIG. 14 shows a block diagram of a communications manager that supports layer mapping methods for piggybacked DCI in accordance with aspects of the present disclosure.

FIG. 14 shows a block diagram 1400 of a communications manager 1405 that supports layer mapping methods for piggybacked DCI in accordance with aspects of the present disclosure. The communications manager 1405 may be an example of aspects of a communications manager 1215, a communications manager 1315, or a communications manager 1510 described herein. The communications manager 1405 may include a DCI configuration manager 1410, a first DCI message manager 1415, a piggybacked DCI message manager 1420, a DCI mapping manager 1425, and a payload comparison manager 1430. Each of these modules may communicate, directly or indirectly, with one another (e.g., via one or more buses).

The DCI configuration manager 1410 may identify, for a UE, a configuration for receiving a set of DCI messages on one or more layers of a set of layers of a downlink shared channel. The first DCI message manager 1415 may transmit, to the UE, a first DCI message in a downlink control channel, the first DCI message scheduling first resources of the downlink shared channel for the set of DCI messages. The piggybacked DCI message manager 1420 may transmit, to the UE, the set of DCI messages on the one or more layers of the downlink shared channel based on the identified configuration.

The DCI mapping manager 1425 may map the set of DCI messages to a single layer, where the set of DCI messages are transmitted on the single layer. In some cases, the set of DCI messages are mapped to the single layer based on the single layer having a highest MCS for the set of layers. In some cases, the set of DCI messages are mapped to the single layer based on the single layer having a highest SNR for the set of layers. In some cases, the set of DCI messages are mapped to the single layer based on the single layer having a lowest index value for the set of layers.

The payload comparison manager 1430 may compare a first payload size of the set of DCI messages on a single layer of the set of layers to a second payload size of the downlink shared channel on the single layer. In some examples, the DCI mapping manager 1425 may map, based on a result of the comparing, the set of DCI messages to the single layer, where the set of DCI messages are transmitted on the single layer. In some cases, an MCS associated with the downlink shared channel for the single layer is a highest MCS for the downlink shared channel for the set of layers.

In some examples, the payload comparison manager 1430 may compare a first payload size of the set of DCI messages to a second payload size of the downlink shared channel. In some examples, the DCI mapping manager 1425 may map, based on a result of the comparing, the set of DCI messages to multiple layers, where the set of DCI messages are transmitted on the multiple layers. In some cases, an MCS associated with the second payload size of the downlink shared channel is a highest MCS for the downlink shared channel for the set of layers.

In some examples, the DCI mapping manager 1425 may map the set of DCI messages to multiple layers, the set of DCI messages transmitted on the multiple layers, where, for each layer of the multiple layers, a first number of DCI messages of the set of DCI messages mapped to the layer is no more than one different than a second number of DCI messages of the set of DCI messages mapped to any other layer of the multiple layers.

In some cases, the first number of DCI messages is a same number for each layer of the multiple layers. In some cases, the first number of DCI messages for the layer is a different number than the second number of DCI messages for at least one other layer of the multiple layers. In some cases, the first number of DCI messages includes a first portion of a second DCI message, and the second number of DCI messages includes a second portion of the second DCI message. In some cases, the set of DCI messages are concatenated on the one or more layers.

Figure 15:
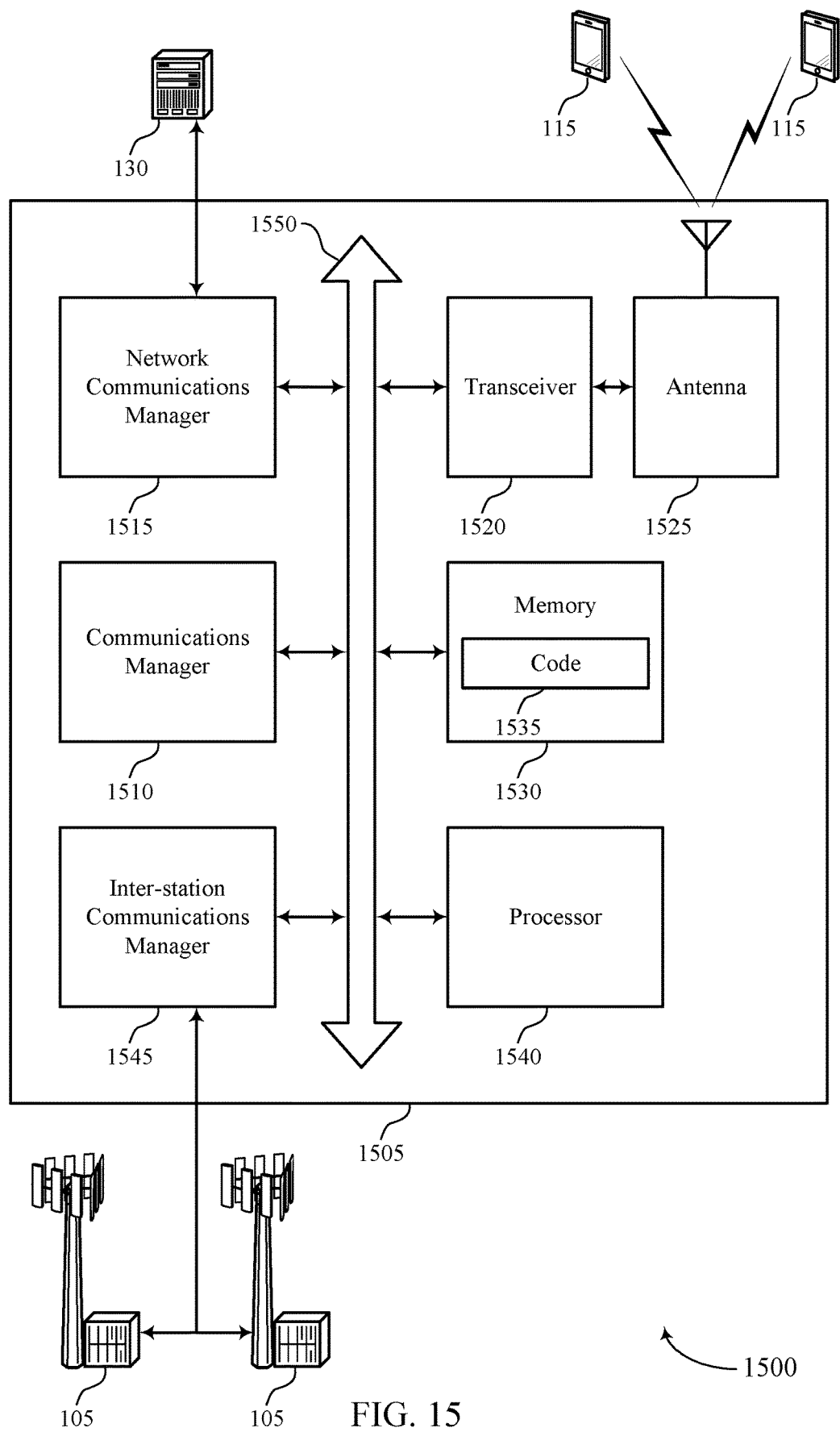
FIG. 15 shows a diagram of a system including a device that supports layer mapping methods for piggybacked DCI in accordance with aspects of the present disclosure.

FIG. 15 shows a diagram of a system 1500 including a device 1505 that supports layer mapping methods for piggybacked DCI in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may identify, for a UE, a configuration for receiving a set of DCI messages on one or more layers of a set of layers of a downlink shared channel, transmit, to the UE, a first DCI message in a downlink control channel, the first DCI message scheduling first resources of the downlink shared channel for the set of DCI messages, and transmit, to the UE, the set of DCI messages on the one or more layers of the downlink shared channel based on the identified configuration.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting layer mapping methods for piggybacked DCI).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
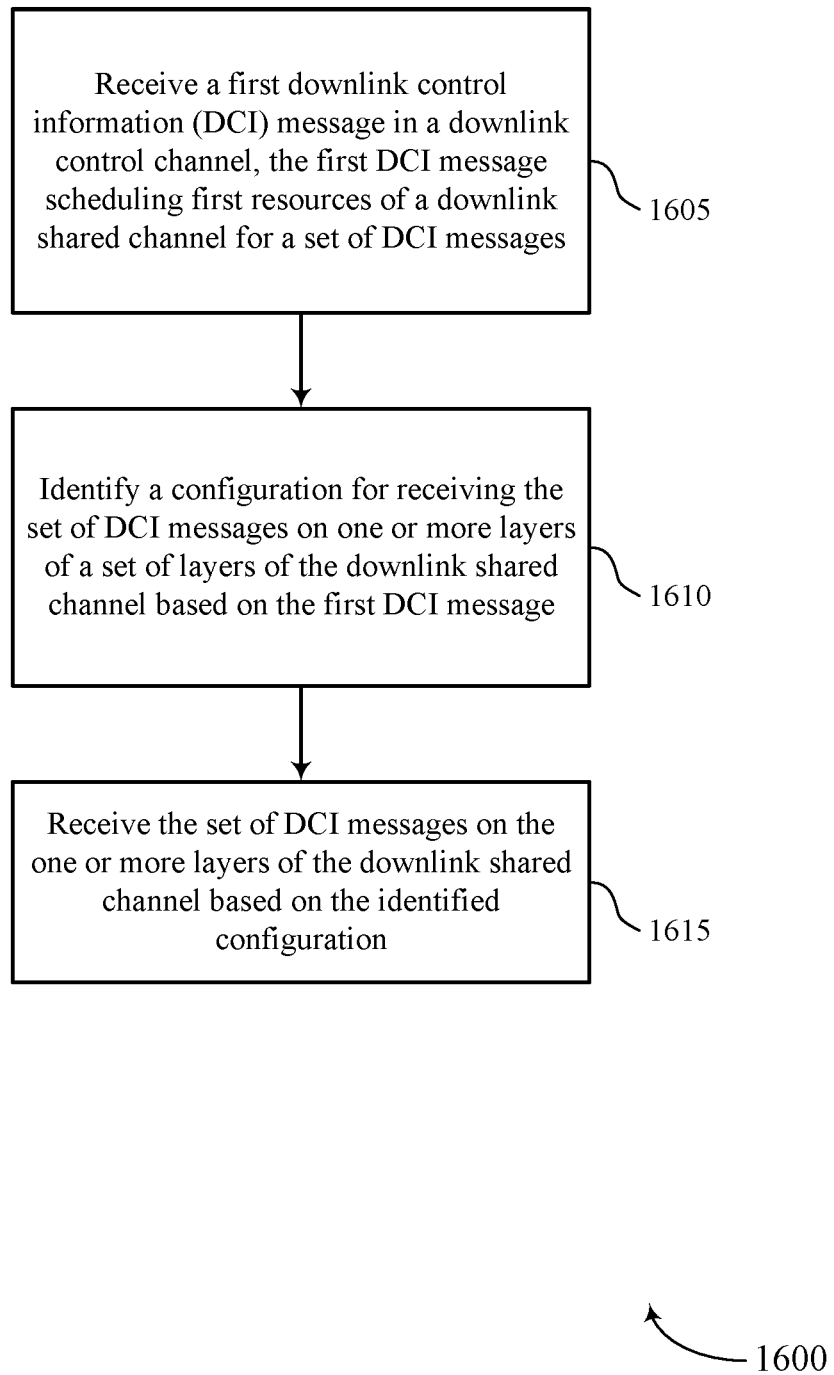
FIGS. 16 through 19 show flowcharts illustrating methods that support layer mapping methods for piggybacked DCI in accordance with aspects of the present disclosure.

FIG. 16 shows a flowchart illustrating a method 1600 that supports layer mapping methods for piggybacked DCI in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive a first DCI message in a downlink control channel, the first DCI message scheduling first resources of a downlink shared channel for a set of DCI messages. The operations of 1605 may be performed according to the methods described herein. In some examples, aspects of the operations of 1605 may be performed by a first DCI message module as described with reference to FIGS. 8 through 11.

At 1610, the UE may identify a configuration for receiving the set of DCI messages on one or more layers of a set of layers of the downlink shared channel based on the first DCI message. The operations of 1610 may be performed according to the methods described herein. In some examples, aspects of the operations of 1610 may be performed by a DCI configuration identifier as described with reference to FIGS. 8 through 11.

At 1615, the UE may receive the set of DCI messages on the one or more layers of the downlink shared channel based on the identified configuration. The operations of 1615 may be performed according to the methods described herein. In some examples, aspects of the operations of 1615 may be performed by a piggybacked DCI message module as described with reference to FIGS. 8 through 11.

Figure 17:
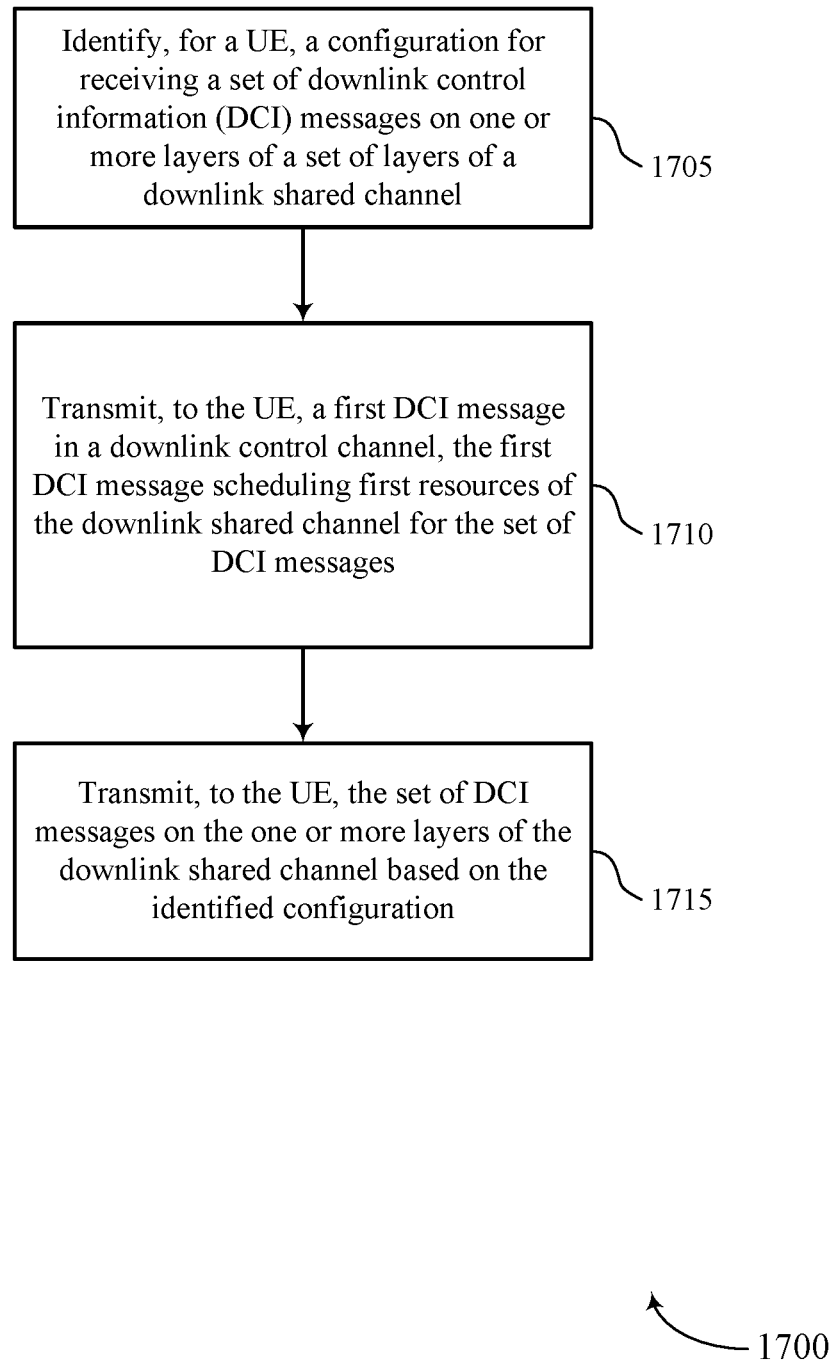

FIG. 17 shows a flowchart illustrating a method 1700 that supports layer mapping methods for piggybacked DCI in accordance with aspects of the present disclosure. The operations of method 1700 may be implemented by a base station 105 or its components as described herein. For example, the operations of method 1700 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1705, the base station may identify, for a UE, a configuration for receiving a set of DCI messages on one or more layers of a set of layers of a downlink shared channel. The operations of 1705 may be performed according to the methods described herein. In some examples, aspects of the operations of 1705 may be performed by a DCI configuration manager as described with reference to FIGS. 12 through 15.

At 1710, the base station may transmit, to the UE, a first DCI message in a downlink control channel, the first DCI message scheduling first resources of the downlink shared channel for the set of DCI messages. The operations of 1710 may be performed according to the methods described herein. In some examples, aspects of the operations of 1710 may be performed by a first DCI message manager as described with reference to FIGS. 12 through 15.

At 1715, the base station may transmit, to the UE, the set of DCI messages on the one or more layers of the downlink shared channel based on the identified configuration. The operations of 1715 may be performed according to the methods described herein. In some examples, aspects of the operations of 1715 may be performed by a piggybacked DCI message manager as described with reference to FIGS. 12 through 15.

Figure 18:
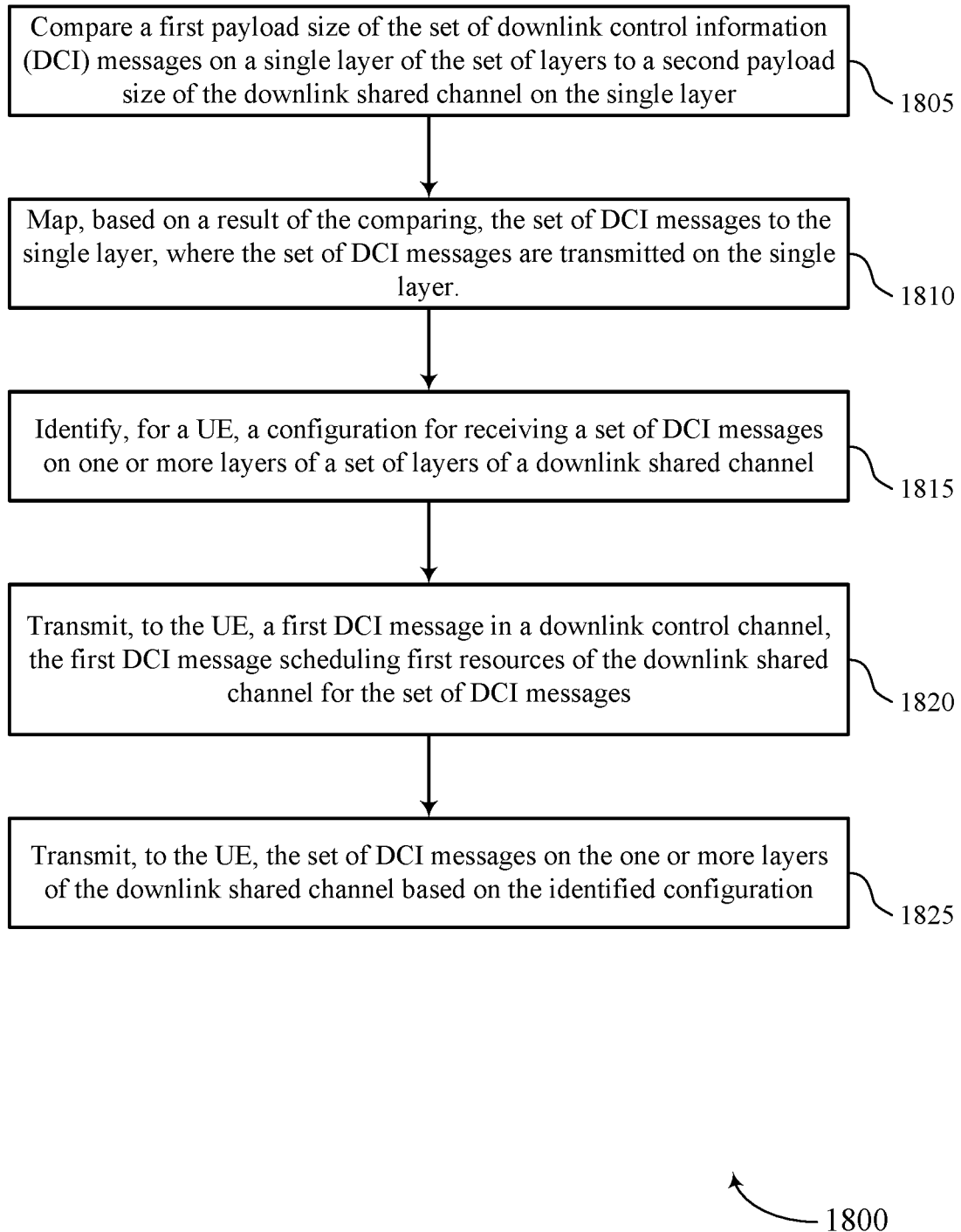

FIG. 18 shows a flowchart illustrating a method 1800 that supports layer mapping methods for piggybacked DCI in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1805, the base station may compare a first payload size of the set of DCI messages on a single layer of the set of layers to a second payload size of the downlink shared channel on the single layer. The operations of 1805 may be performed according to the methods described herein. In some examples, aspects of the operations of 1805 may be performed by a payload comparison manager as described with reference to FIGS. 12 through 15.

At 1810, the base station may map, based on a result of the comparing, the set of DCI messages to the single layer, where the set of DCI messages are transmitted on the single layer. The operations of 1810 may be performed according to the methods described herein. In some examples, aspects of the operations of 1810 may be performed by a DCI mapping manager as described with reference to FIGS. 12 through 15.

At 1815, the base station may identify, for a UE, a configuration for receiving a set of DCI messages on one or more layers of a set of layers of a downlink shared channel. The operations of 1815 may be performed according to the methods described herein. In some examples, aspects of the operations of 1815 may be performed by a DCI configuration manager as described with reference to FIGS. 12 through 15.

At 1820, the base station may transmit, to the UE, a first DCI message in a downlink control channel, the first DCI message scheduling first resources of the downlink shared channel for the set of DCI messages. The operations of 1820 may be performed according to the methods described herein. In some examples, aspects of the operations of 1820 may be performed by a first DCI message manager as described with reference to FIGS. 12 through 15.

At 1825, the base station may transmit, to the UE, the set of DCI messages on the one or more layers of the downlink shared channel based on the identified configuration. The operations of 1825 may be performed according to the methods described herein. In some examples, aspects of the operations of 1825 may be performed by a piggybacked DCI message manager as described with reference to FIGS. 12 through 15.

Figure 19:
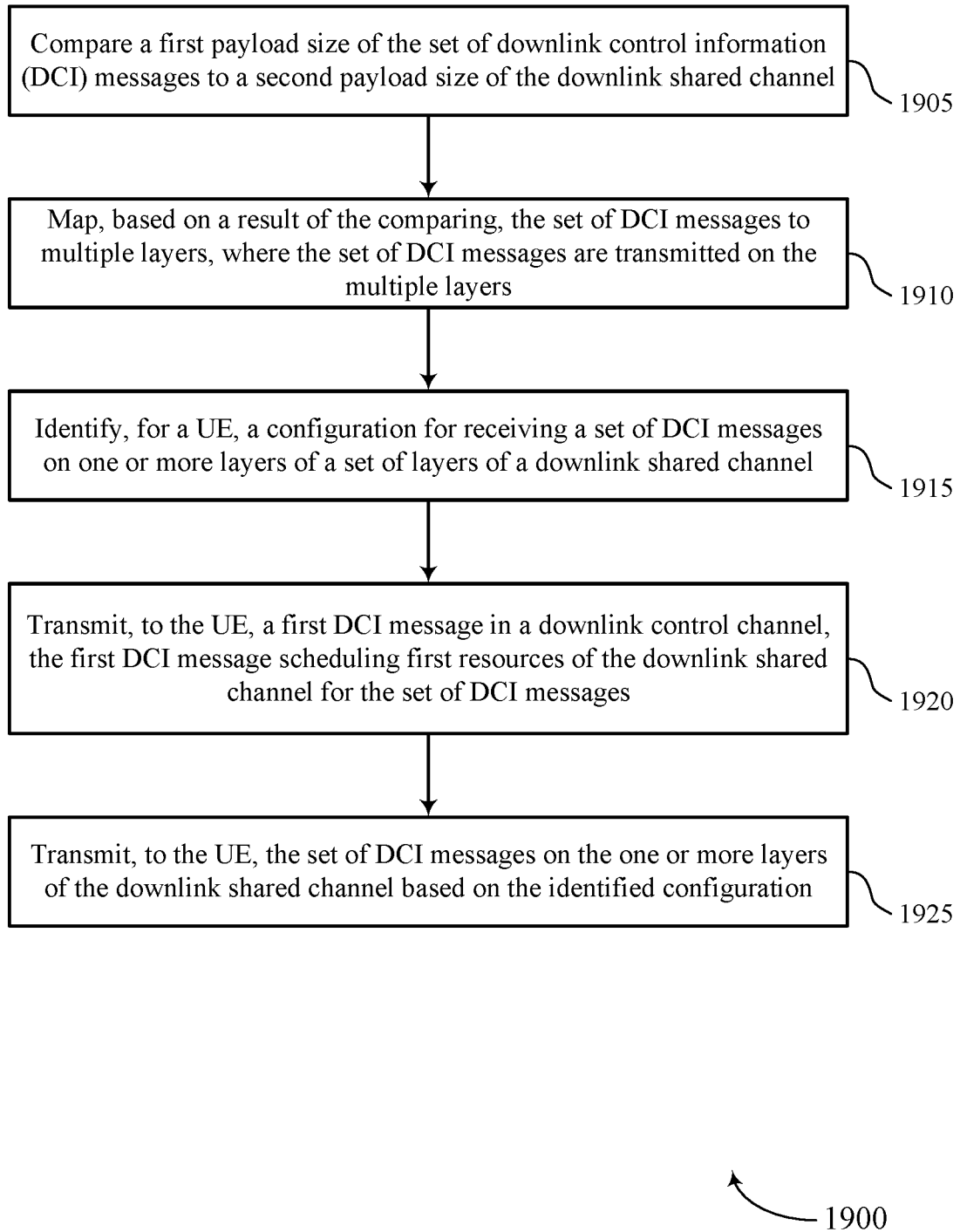

FIG. 19 shows a flowchart illustrating a method 1900 that supports layer mapping methods for piggybacked DCI in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may compare a first payload size of the set of DCI messages to a second payload size of the downlink shared channel. The operations of 1905 may be performed according to the methods described herein. In some examples, aspects of the operations of 1905 may be performed by a payload comparison manager as described with reference to FIGS. 12 through 15.

At 1910, the base station may map, based on a result of the comparing, the set of DCI messages to multiple layers, where the set of DCI messages are transmitted on the multiple layers. The operations of 1910 may be performed according to the methods described herein. In some examples, aspects of the operations of 1910 may be performed by a DCI mapping manager as described with reference to FIGS. 12 through 15.

At 1915, the base station may identify, for a UE, a configuration for receiving a set of DCI messages on one or more layers of a set of layers of a downlink shared channel. The operations of 1915 may be performed according to the methods described herein. In some examples, aspects of the operations of 1915 may be performed by a DCI configuration manager as described with reference to FIGS. 12 through 15.

At 1920, the base station may transmit, to the UE, a first DCI message in a downlink control channel, the first DCI message scheduling first resources of the downlink shared channel for the set of DCI messages. The operations of 1920 may be performed according to the methods described herein. In some examples, aspects of the operations of 1920 may be performed by a first DCI message manager as described with reference to FIGS. 12 through 15.

At 1925, the base station may transmit, to the UE, the set of DCI messages on the one or more layers of the downlink shared channel based on the identified configuration. The operations of 1925 may be performed according to the methods described herein. In some examples, aspects of the operations of 1925 may be performed by a piggybacked DCI message manager as described with reference to FIGS. 12 through 15.

The following provides an overview of aspects of the present disclosure:

Aspect 1: A method for wireless communications at a UE, comprising: receiving a first downlink control information message in a downlink control channel, the first downlink control information message scheduling first resources of a downlink shared channel for a set of downlink control information messages; identifying a configuration for receiving the set of downlink control information messages on one or more layers of a plurality of layers of the downlink shared channel based at least in part on the first downlink control information message; and receiving the set of downlink control information messages on the one or more layers of the downlink shared channel based at least in part on the identified configuration.

Aspect 2: The method of aspect 1, wherein identifying the configuration comprises: identifying that the set of downlink control information messages are mapped to a single layer of the plurality of layers, wherein the one or more layers comprise the single layer.

Aspect 3: The method of aspect 2, wherein the set of downlink control information messages are mapped to the single layer based at least in part on the single layer having a highest modulation and coding scheme for the plurality of layers, a highest signal to noise ratio for the plurality of layers, a lowest index value for the plurality of layers, or any combination thereof.

Aspect 4: The method of any of aspects 2 through 3, further comprising: identifying a ratio of a first payload size of the set of downlink control information messages mapped to the single layer to a second payload size of the downlink shared channel mapped to the single layer; and determining that the ratio fails to satisfy a threshold value, wherein the set of downlink control information messages are mapped to the single layer based at least in part on the determining.

Aspect 5: The method of aspect 4, wherein a modulation and coding scheme associated with the downlink shared channel for the single layer is a highest modulation and coding scheme for the downlink shared channel for the plurality of layers.

Aspect 6: The method of any of aspects 1 through 5, wherein identifying the configuration comprises: identifying a ratio of a first payload size of the set of downlink control information messages mapped to a single layer of the plurality of layers to a second payload size of the downlink shared channel mapped to the single layer; and determining that the ratio satisfies a threshold value, wherein the set of downlink control information messages are mapped to multiple layers of the plurality of layers based at least in part on the determining.

Aspect 7: The method of aspect 6, wherein a modulation and coding scheme associated with the second payload size of the downlink shared channel is a highest modulation and coding scheme for the downlink shared channel for the plurality of layers.

Aspect 8: The method of any of aspects 1 through 7, wherein identifying the configuration comprises: identifying that the set of downlink control information messages are mapped to multiple layers of the plurality of layers; and identifying, for each layer of the multiple layers, that a first number of downlink control information messages of the set of downlink control information messages mapped to the layer is no more than one different than a second number of downlink control information messages of the set of downlink control information messages mapped to any other layer of the multiple layers.

Aspect 9: The method of aspect 8, wherein the first number of downlink control information messages is a same number for each layer of the multiple layers.

Aspect 10: The method of any of aspects 8 through 9, wherein the first number of downlink control information messages for the layer is a different number than the second number of downlink control information messages for at least one other layer of the multiple layers.

Aspect 11: The method of any of aspects 8 through 10, wherein the first number of downlink control information messages comprises a first portion of a second downlink control information message, and the second number of downlink control information messages comprises a second portion of the second downlink control information message.

Aspect 12: The method of any of aspects 1 through 11, wherein the set of downlink control information messages are concatenated on the one or more layers.

Aspect 13: A method for wireless communication at a base station, comprising: identifying, for a UE, a configuration for receiving a set of downlink control information messages on one or more layers of a plurality of layers of a downlink shared channel; transmitting, to the UE, a first downlink control information message in a downlink control channel, the first downlink control information message scheduling first resources of the downlink shared channel for the set of downlink control information messages; and transmitting, to the UE, the set of downlink control information messages on the one or more layers of the downlink shared channel based at least in part on the identified configuration.

Aspect 14: The method of aspect 13, further comprising: mapping the set of downlink control information messages to a single layer, wherein the set of downlink control information messages are transmitted on the single layer.

Aspect 15: The method of aspect 14, wherein the set of downlink control information messages are mapped to the single layer based at least in part on the single layer having a highest modulation and coding scheme for the plurality of layers, a highest signal to noise ratio for the plurality of layers, a lowest index value for the plurality of layers, or any combination thereof.

Aspect 16: The method of any of aspects 13 through 15, further comprising: comparing a first payload size of the set of downlink control information messages on a single layer of the plurality of layers to a second payload size of the downlink shared channel on the single layer; and mapping, based at least in part on a result of the comparing, the set of downlink control information messages to the single layer, wherein the set of downlink control information messages are transmitted on the single layer.

Aspect 17: The method of aspect 16, wherein a modulation and coding scheme associated with the downlink shared channel for the single layer is a highest modulation and coding scheme for the downlink shared channel for the plurality of layers.

Aspect 18: The method of any of aspects 13 through 17, further comprising: comparing a first payload size of the set of downlink control information messages to a second payload size of the downlink shared channel; and mapping, based at least in part on a result of the comparing, the set of downlink control information messages to multiple layers, wherein the set of downlink control information messages are transmitted on the multiple layers.

Aspect 19: The method of aspect 18, wherein a modulation and coding scheme associated with the second payload size of the downlink shared channel is a highest modulation and coding scheme for the downlink shared channel for the plurality of layers.

Aspect 20: The method of any of aspects 13 through 19, further comprising: mapping the set of downlink control information messages to multiple layers, the set of downlink control information messages transmitted on the multiple layers, wherein, for each layer of the multiple layers, a first number of downlink control information messages of the set of downlink control information messages mapped to the layer is no more than one different than a second number of downlink control information messages of the set of downlink control information messages mapped to any other layer of the multiple layers.

Aspect 21: The method of aspect 20, wherein the first number of downlink control information messages is a same number for each layer of the multiple layers.

Aspect 22: The method of any of aspects 20 through 21, wherein the first number of downlink control information messages for the layer is a different number than the second number of downlink control information messages for at least one other layer of the multiple layers.

Aspect 23: The method of any of aspects 20 through 22, wherein the first number of downlink control information messages comprises a first portion of a second downlink control information message, and the second number of downlink control information messages comprises a second portion of the second downlink control information message.

Aspect 24: The method of any of aspects 13 through 23, wherein the set of downlink control information messages are concatenated on the one or more layers.

Aspect 25: An apparatus for wireless communications at a UE, comprising a processor; memory coupled with the processor; and instructions stored in the memory and executable by the processor to cause the apparatus to perform a method of any of aspects 1 through 12.

Aspect 26: An apparatus for wireless communications at a UE, comprising at least one means for performing a method of any of aspects 1 through 12.

Aspect 27: A non-transitory computer-readable medium storing code for wireless communications at a UE, the code comprising instructions executable by a processor to perform a method of any of aspects 1 through 12.

Aspect 28: An apparatus for wireless communication at a base station, comprising a processor; memory coupled with the processor; and instructions stored in the memory and executable by the processor to cause the apparatus to perform a method of any of aspects 13 through 24.

Aspect 29: An apparatus for wireless communication at a base station, comprising at least one means for performing a method of any of aspects 13 through 24.

Aspect 30: A non-transitory computer-readable medium storing code for wireless communication at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a first downlink control information message in a downlink control channel, the first downlink control information message scheduling first resources of a downlink shared channel for a set of downlink control information messages;
   identifying a configuration for receiving the set of downlink control information messages on one or more layers of a plurality of layers of the downlink shared channel based at least in part on the first downlink control information message; and
   receiving the set of downlink control information messages on the one or more layers of the downlink shared channel based at least in part on the identified configuration.

2. The method of claim 1, wherein identifying the configuration comprises:
   identifying that the set of downlink control information messages are mapped to a single layer of the plurality of layers, wherein the one or more layers comprise the single layer.

3. The method of claim 2, wherein the set of downlink control information messages are mapped to the single layer based at least in part on the single layer having a highest modulation and coding scheme for the plurality of layers, a highest signal to noise ratio for the plurality of layers, a lowest index value for the plurality of layers, or any combination thereof.

4. The method of claim 2, further comprising:
   identifying a ratio of a first payload size of the set of downlink control information messages mapped to the single layer to a second payload size of the downlink shared channel mapped to the single layer; and
   determining that the ratio fails to satisfy a threshold value, wherein the set of downlink control information messages are mapped to the single layer based at least in part on the determining.

5. The method of claim 4, wherein a modulation and coding scheme associated with the downlink shared channel for the single layer is a highest modulation and coding scheme for the downlink shared channel for the plurality of layers.

6. The method of claim 1, wherein identifying the configuration comprises:
   identifying a ratio of a first payload size of the set of downlink control information messages mapped to a single layer of the plurality of layers to a second payload size of the downlink shared channel mapped to the single layer; and
   determining that the ratio satisfies a threshold value, wherein the set of downlink control information messages are mapped to multiple layers of the plurality of layers based at least in part on the determining.

7. The method of claim 6, wherein a modulation and coding scheme associated with the second payload size of the downlink shared channel is a highest modulation and coding scheme for the downlink shared channel for the plurality of layers.

8. The method of claim 1, wherein identifying the configuration comprises:
   identifying that the set of downlink control information messages are mapped to multiple layers of the plurality of layers; and
   identifying, for each layer of the multiple layers, that a first number of downlink control information messages of the set of downlink control information messages mapped to the layer is no more than one different than a second number of downlink control information messages of the set of downlink control information messages mapped to any other layer of the multiple layers.

9. The method of claim 8, wherein the first number of downlink control information messages is a same number for each layer of the multiple layers.

10. The method of claim 8, wherein the first number of downlink control information messages for the layer is a different number than the second number of downlink control information messages for at least one other layer of the multiple layers.

11. The method of claim 8, wherein the first number of downlink control information messages comprises a first portion of a second downlink control information message, and the second number of downlink control information messages comprises a second portion of the second downlink control information message.

12. The method of claim 1, wherein the set of downlink control information messages are concatenated on the one or more layers.

13. A method for wireless communication at a network device, comprising:
identifying, for a user equipment (UE), a configuration for receiving a set of downlink control information messages on one or more layers of a plurality of layers of a downlink shared channel;
transmitting, to the UE, a first downlink control information message in a downlink control channel, the first downlink control information message scheduling first resources of the downlink shared channel for the set of downlink control information messages; and
transmitting, to the UE, the set of downlink control information messages on the one or more layers of the downlink shared channel based at least in part on the identified configuration.

14. The method of claim 13, further comprising:
mapping the set of downlink control information messages to a single layer, wherein the set of downlink control information messages are transmitted on the single layer.

15. The method of claim 14, wherein the set of downlink control information messages are mapped to the single layer based at least in part on the single layer having a highest modulation and coding scheme for the plurality of layers, a highest signal to noise ratio for the plurality of layers, a lowest index value for the plurality of layers, or any combination thereof.

16. The method of claim 13, further comprising:
comparing a first payload size of the set of downlink control information messages on a single layer of the plurality of layers to a second payload size of the downlink shared channel on the single layer; and
mapping, based at least in part on a result of the comparing, the set of downlink control information messages to the single layer, wherein the set of downlink control information messages are transmitted on the single layer.

17. The method of claim 16, wherein a modulation and coding scheme associated with the downlink shared channel for the single layer is a highest modulation and coding scheme for the downlink shared channel for the plurality of layers.

18. The method of claim 13, further comprising:
comparing a first payload size of the set of downlink control information messages to a second payload size of the downlink shared channel; and
mapping, based at least in part on a result of the comparing, the set of downlink control information messages to multiple layers, wherein the set of downlink control information messages are transmitted on the multiple layers.

19. The method of claim 18, wherein a modulation and coding scheme associated with the second payload size of the downlink shared channel is a highest modulation and coding scheme for the downlink shared channel for the plurality of layers.

20. The method of claim 13, further comprising:
mapping the set of downlink control information messages to multiple layers, the set of downlink control information messages transmitted on the multiple layers, wherein, for each layer of the multiple layers, a first number of downlink control information messages of the set of downlink control information messages mapped to the layer is no more than one different than a second number of downlink control information messages of the set of downlink control information messages mapped to any other layer of the multiple layers.

21. The method of claim 20, wherein the first number of downlink control information messages is a same number for each layer of the multiple layers.

22. The method of claim 20, wherein the first number of downlink control information messages for the layer is a different number than the second number of downlink control information messages for at least one other layer of the multiple layers.

23. The method of claim 20, wherein the first number of downlink control information messages comprises a first portion of a second downlink control information message, and the second number of downlink control information messages comprises a second portion of the second downlink control information message.

24. The method of claim 13, wherein the set of downlink control information messages are concatenated on the one or more layers.

25. An apparatus for wireless communications at a user equipment (UE), comprising:
a processor,
memory coupled with the processor; and
instructions stored in the memory and executable by the processor to cause the apparatus to:
receive a first downlink control information message in a downlink control channel, the first downlink control information message scheduling first resources of a downlink shared channel for a set of downlink control information messages;
identify a configuration for receiving the set of downlink control information messages on one or more layers of a plurality of layers of the downlink shared channel based at least in part on the first downlink control information message; and
receive the set of downlink control information messages on the one or more layers of the downlink shared channel based at least in part on the identified configuration.

26. The apparatus of claim 25, wherein the instructions to identify the configuration are executable by the processor to cause the apparatus to:
identify that the set of downlink control information messages are mapped to a single layer of the plurality of layers, wherein the one or more layers comprise the single layer.

27. The apparatus of claim 25, wherein the instructions to identify the configuration are executable by the processor to cause the apparatus to:
identify that the set of downlink control information messages are mapped to multiple layers of the plurality of layers; and
identify, for each layer of the multiple layers, that a first number of downlink control information messages of the set of downlink control information messages mapped to the layer is no more than one different than a second number of downlink control information messages of the set of downlink control information messages mapped to any other layer of the multiple layers.

28. An apparatus for wireless communication at a network device, comprising:
a processor, memory coupled with the processor; and instructions stored in the memory and executable by the processor to cause the apparatus to:

identify, for a user equipment (UE), a configuration for receiving a set of downlink control information messages on one or more layers of a plurality of layers of a downlink shared channel;

transmit, to the UE, a first downlink control information message in a downlink control channel, the first downlink control information message scheduling first resources of the downlink shared channel for the set of downlink control information messages; and transmit, to the UE, the set of downlink control information messages on the one or more layers of the downlink shared channel based at least in part on the identified configuration.

29. The apparatus of claim 28, wherein the instructions are further executable by the processor to cause the apparatus to:

map the set of downlink control information messages to a single layer of the plurality of layers, wherein the one or more layers comprise the single layer.

30. The apparatus of claim 28, wherein the instructions to identify the configuration are executable by the processor to cause the apparatus to:

map the set of downlink control information messages to multiple layers, the set of downlink control information messages transmitted on the multiple layers, wherein, for each layer of the multiple layers, a first number of downlink control information messages of the set of downlink control information messages mapped to the layer is no more than one different than a second number of downlink control information messages of the set of downlink control information messages mapped to any other layer of the multiple layers.

* * * * *